(12) United States Patent
Zhang et al.

(10) Patent No.: US 12,371,327 B2
(45) Date of Patent: Jul. 29, 2025

(54) METHODS FOR PREPARING NANO-ORDERED CARBON ANODE MATERIALS FOR SODIUM-ION BATTERIES

(71) Applicant: PHILLIPS 66 COMPANY, Houston, TX (US)

(72) Inventors: Liang Zhang, Owasso, OK (US); Jinfeng Lai, Bartlesville, OK (US); Leonard Nyadong, Owasso, OK (US); Codruta Elena Platon, Bartlesville, OK (US); Barbara Ann Todd, Niotaze, KS (US); Brian J. Worfolk, Raleigh, NC (US)

(73) Assignee: Phillips 66 Company, Houston, TX (US)

( * ) Notice: Subject to any disclaimer, the term of this patent is extended or adjusted under 35 U.S.C. 154(b) by 647 days.

(21) Appl. No.: 17/873,390

(22) Filed: Jul. 26, 2022

(65) Prior Publication Data
US 2023/0048135 A1 Feb. 16, 2023

Related U.S. Application Data

(60) Provisional application No. 63/230,868, filed on Aug. 9, 2021, provisional application No. 63/304,811, filed on Jan. 31, 2022, provisional application No. 63/304,888, filed on Jan. 31, 2022.

(51) Int. Cl.
*C01B 32/184* (2017.01)

(52) U.S. Cl.
CPC ........ *C01B 32/184* (2017.08); *C01B 2204/22* (2013.01); *C01P 2004/60* (2013.01); *C01P 2006/40* (2013.01)

(58) Field of Classification Search
CPC ... C01B 32/184; C01B 2204/22; C01B 32/05; C01P 2004/60; C01P 2004/40; H01M 4/587; H01M 10/054; Y02E 60/10
See application file for complete search history.

(56) References Cited

U.S. PATENT DOCUMENTS

2006/0216222 A1* 9/2006 Jang .................. B82Y 30/00
423/448

FOREIGN PATENT DOCUMENTS

| EP | 1739771 | 8/2013 |
|----|---------|--------|
| EP | 3358656 | 12/2019 |

* cited by examiner

*Primary Examiner* — Anthony J Zimmer
*Assistant Examiner* — Jaanzeb C Raja
(74) *Attorney, Agent, or Firm* — Phillips 66 Company

(57) ABSTRACT

Embodiments of the present disclosure generally relate to methods for preparing carbon materials which can be used in battery electrodes. More specifically, embodiments relate to methods for preparing nano-ordered carbon products used as anode materials in metal-ion batteries, such as a sodium-ion battery. In some embodiments, a method includes fractioning an initial refinery hydrocarbon product during a fractionation process to produce a liquid refinery hydrocarbon product and a heavy refinery hydrocarbon product. The method includes exposing either or both refinery hydrocarbon products to a first functionalization agent to produce a first solid functionalized product during a first functionalization process and purifying the first solid functionalized product during a purification process. The method also includes exposing the first solid functionalized product to a second functionalization agent to produce a second solid functionalized product during a second functionalization process and carbonizing the second solid functionalized product to produce the nano-ordered carbon product during a carbonization process.

24 Claims, 15 Drawing Sheets

METHODS FOR PREPARING NANO-ORDERED CARBON ANODE MATERIALS FOR SODIUM-ION BATTERIES

CROSS-REFERENCE TO RELATED APPLICATIONS

This application is a Non-Provisional Patent Application which claims the benefit of and priority to U.S. Provisional Application Ser. No. 63/230,868 filed Aug. 9, 2021 entitled "Multi Functionalization of Petroleum Products", U.S. Provisional Application Ser. No. 63/304,811 filed Jan. 31, 2022, entitled "Methods for Preparing Nano-Ordered Carbon Products from Petroleum Streams", and U.S. Provisional Application Ser. No. 63/304,888 filed Jan. 31, 2022, entitled "Methods for Preparing Nano-Ordered Carbon Anode Materials for Sodium-Ion Batteries" all of which are hereby incorporated by reference in their entirety.

BACKGROUND

Field

Embodiments of the present disclosure generally relate to battery technology, and more specifically, methods for preparing carbon-based materials used in battery technology.

Description of the Related Art

In recent years, large secondary batteries with high energy density and excellent output characteristics are being mounted in electric vehicles in response to increasing concern over environmental issues. Lithium-ion battery technology has enjoyed a lot of attention in recent years and provides the preferred portable battery for most electronic devices in use today. However, lithium is not a cheap metal to source and is considered too expensive for use in large scale battery applications. By contrast sodium-ion battery technology is still in a relative infancy stage but is seen as having many advantages over lithium. Sodium is a more abundant element than lithium. As such, some researchers predict sodium-ion batteries will provide a cheaper and more durable way to store energy into the future, particularly for large scale applications such as storing energy on the electrical grid. Nevertheless, a lot of work has to be done before sodium-ion batteries are a commercial reality.

Sodium-ion batteries are analogous in many ways to the lithium-ion batteries that are in common use today. Both types of batteries are reusable secondary batteries that include an anode (negative electrode), a cathode (positive electrode), and an electrolyte material. Also, both types of batteries are capable of charging and discharging via a similar reaction mechanism. When a sodium-ion (or lithium-ion) battery is charging, the metal ions (Na+ or Li+) de-intercalate from the cathode and insert into the anode. Meanwhile charge balancing electrons pass from the cathode through the external circuit containing the charger and into the anode of the battery. During discharge the same process occurs but in the opposite direction.

Hard carbon with nano-ordered structure is considered so far the most commercially promising anode materials for sodium ion batteries. This material has been conventionally derived from biomass feedstocks that contain significant amounts of oxygen. These feedstocks are difficult to collect due to localized nature, difficult to process due to large amount of impurities, and challenging to control quality which leads to inconsistent product. In addition, the yield from these feedstocks are known to be low, such as about 10%-20%.

Heavy refinery hydrocarbon streams are ideal as natural building blocks for value-added carbonaceous materials in batteries. Conventional approaches to making hard carbon products from petroleum-based feedstock usually are carried out via a lengthy process. For example, a hard carbon material can be made from a petroleum pitch by mixing the pitch with an additive in a heated molten state followed by extruding into pellets, emulsification into micro-sized particles, removing additives by solvent washing, air oxidation in fluidized bed reactor, and calcining in high temperature furnace.

Therefore, there is a need for improved methods to prepare carbon materials capable of having high specific capacity and desired structural parameters, and where the methods are faster, more efficient, and produce greater yields than traditional methods for preparing similar carbon materials. In addition, it is highly desirable to have a practical method to ensure operation consistency and control product performance.

SUMMARY

Embodiments of the present disclosure generally relate to methods for preparing carbon materials which can be used in battery electrodes. More specifically, embodiments relate to methods for preparing solid nano-ordered carbon (NOC) products from hydrocarbon streams which are functionalized by processes described and discussed herein. The solid nano-ordered carbon products can be used as anode materials in metal-ion batteries, such as a sodium-ion battery.

In one or more embodiments, a method for preparing a nano-ordered carbon is provided and includes fractioning an initial refinery hydrocarbon product or petroleum product during a fractionation process to produce a liquid petroleum product having a condensation index of 0.36 or less and a heavy refinery hydrocarbon product or petroleum product having a condensation index of greater than 0.36. The method further includes exposing the liquid refinery hydrocarbon product, the heavy refinery hydrocarbon product, or a mixture thereof to a first functionalization agent to produce a first solid functionalized product during a first functionalization process and purifying the first solid functionalized product during a purification process. The method also includes exposing the first solid functionalized product to a second functionalization agent to produce a second solid functionalized product during a second functionalization process and carbonizing the second solid functionalized product to produce a solid nano-ordered carbon product during a carbonization process.

In other embodiments, a method for preparing a nano-ordered carbon is provided and includes fractioning an initial refinery hydrocarbon product at a temperature of about 315° C. to about 540° C. during a fractionation process to produce a liquid refinery hydrocarbon product having a condensation index of 0.36 or less and exposing the liquid refinery hydrocarbon product to a first functionalization agent to produce a first solid functionalized product during a first functionalization process. The method further includes exposing the first solid functionalized product to a second functionalization agent to produce a second solid functionalized product during a second functionalization process and carbonizing the second solid functionalized product to produce a solid nano-ordered carbon product during a carbonization process.

In some embodiments, a method for preparing a nano-ordered carbon is provided and includes fractioning an initial refinery hydrocarbon product during a fractionation process to produce a liquid refinery hydrocarbon product having a condensation index of 0.36 or less and an average number of aromatic rings of about 2 to about 5 or about 3.20 to about 3.74 and a heavy refinery hydrocarbon product having a condensation index of greater than 0.36. The method further includes exposing the liquid refinery hydrocarbon product, the heavy refinery hydrocarbon product, or a mixture thereof to a first oxidizing agent to produce a first solid functionalized product during a first oxidation process. The first solid functionalized product contains about 1 wt % to less than 15 wt % of oxygen. The method also includes purifying the first solid functionalized product during a purification process and exposing the first solid functionalized product to a second oxidizing agent to produce a second solid functionalized product during a second oxidation process. The second solid functionalized product contains 15 wt % to about 50 wt % of oxygen. The method also includes carbonizing the second solid functionalized product to produce a solid nano-ordered carbon product during a carbonization process.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawing. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the Figures. It is contemplated that elements and features of one or more embodiments may be beneficially incorporated in other embodiments.

DETAILED DESCRIPTION

Figure 1:
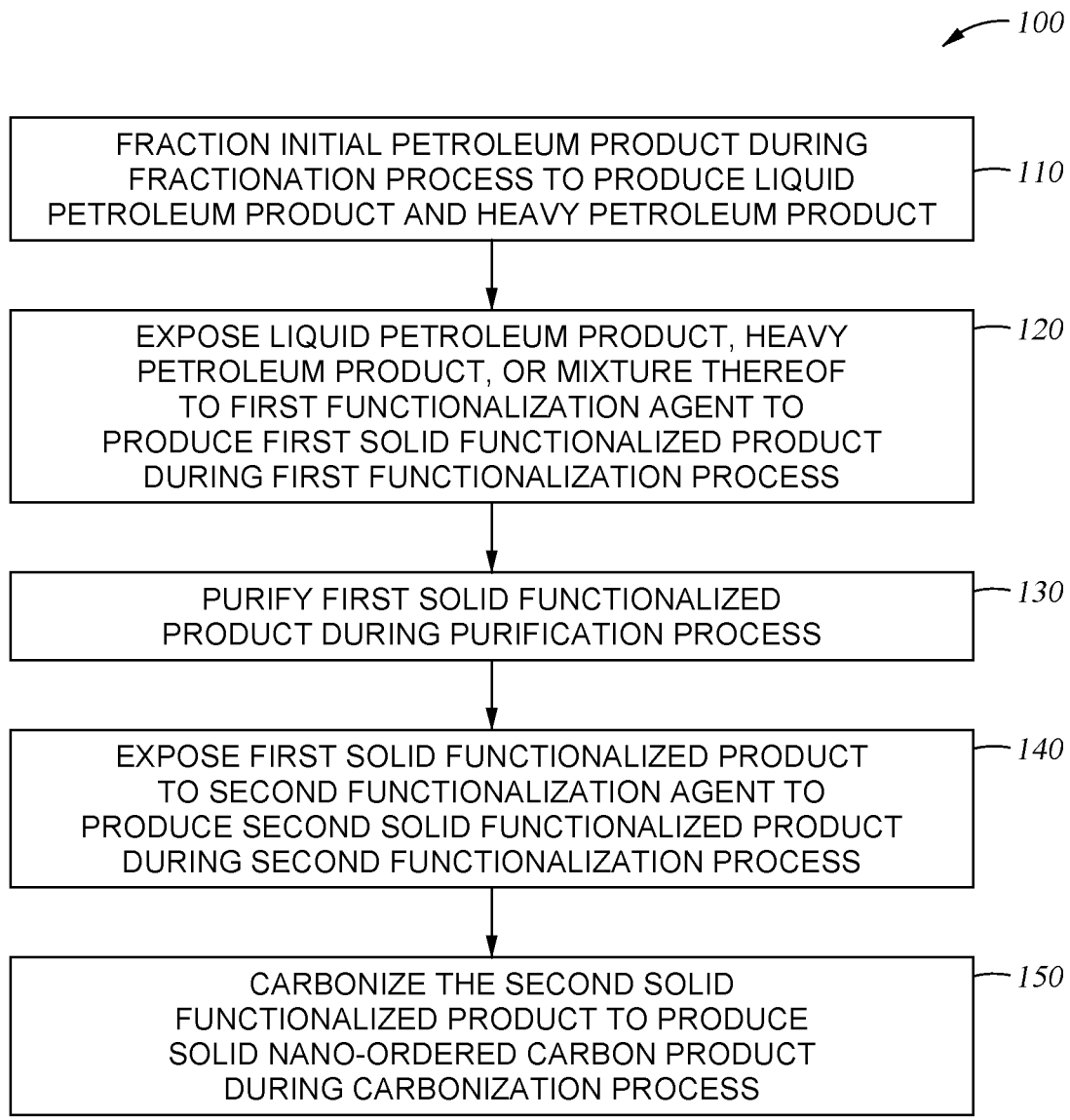
FIG. 1 is a flowchart illustrating a method for preparing solid nano-ordered carbon products, according to one or more embodiments described and discussed herein.

Embodiments of the present disclosure generally relate to methods for preparing carbon materials which can be used in battery electrodes. More specifically, embodiments relate to methods for preparing solid nano-ordered carbon products from hydrocarbon streams which are functionalized by processes described and discussed herein. The solid nano-ordered carbon products can be used as anode materials in metal-ion batteries, such as a sodium-ion battery.

A method is taught for preparing a nano-ordered carbon, comprising fractioning an initial refinery hydrocarbon product during a fractionation process to produce a liquid refinery hydrocarbon product having a condensation index of 0.36 or less and a heavy refinery hydrocarbon product having a condensation index of greater than 0.36. The method then exposes the liquid refinery hydrocarbon product, the heavy refinery hydrocarbon product, or a mixture thereof to a first functionalization agent to produce a first solid functionalized product during a first functionalization process. The method continues to purify, the first solid functionalized product during a purification process. The method can then expose the first solid functionalized product to a second functionalization agent to produce a second solid functionalized product during a second functionalization process. The method then proceeds to carbonize the second solid functionalized product to produce a solid nano-ordered carbon product during a carbonization process.

In one embodiment, the condensation index of the liquid refinery hydrocarbon product is about 0.32 to about 0.36. In an alternate embodiment, the condensation index of the heavy refinery hydrocarbon product is greater than 0.36 to about 0.42.

In one embodiment, the liquid refinery hydrocarbon product has an average boiling point of about 315° C. to about 540° C. In an alternate embodiment, the heavy refinery hydrocarbon product has an average boiling point of about 425° C. to about 650° C. In yet another embodiment, the liquid refinery hydrocarbon product has an average number of aromatic rings of about 2 to about 5 or about 3.20 to about 3.74. In one embodiment, the heavy refinery hydrocarbon product has an average number of aromatic rings of about 3 to about 7 or about 3.75 to about 4.20.

In one embodiment of the method a mixture of the liquid refinery hydrocarbon product and the heavy refinery hydrocarbon product is combined with the first functionalization agent to produce the first solid functionalized product during the first functionalization process. In another embodiment, the mixture of the liquid refinery hydrocarbon product and the heavy refinery hydrocarbon product has a weight ratio of about 90:10 to about 10:90 of the liquid refinery hydrocarbon product relative to the heavy refinery hydrocarbon product.

In one embodiment, the liquid refinery hydrocarbon product comprises a fluid catalytic cracking (FCC) slurry oil, a heavy hydrocarbon stream comprising polyaromatic hydrocarbons, a coker gas oil, a vacuum or distillation gas oil, an ethylene tar, a coal tar, a cracking fluid, or any combination thereof. In yet another embodiment, the first functionalization agent comprises at least one element selected from oxygen, sulfur, phosphorous, nitrogen, or any combination thereof. In one embodiment, each of the first functionalization process and the second functionalization process independently comprises an air oxidation process, an acid treatment process, a sulfurization process, a peroxide oxidation process, an organic compound oxidation process, a crosslinking process, or any combination thereof.

In one method, each of the first functionalization agent and the second functionalization agent is independently selected from oxygen gas ($O_2$), air, oxygen-enriched air, sulfuric acid, nitric acid, phosphoric acid, hydrogen peroxide, elemental sulfur ($S_8$), elemental phosphorus ($P_4$), or any combination thereof. In one embodiment the first solid functionalized product comprises about 1 wt % to less than 15 wt % of a functional group selected from oxygen, sulfur, phosphorous, or nitrogen.

In one method, the first solid functionalized product is ground into particles having an average particle size of less than 250 μm prior to the purification process or the second functionalization process. In yet another embodiment, the first solid functionalized product is exposed to a solvent extraction during the purification process.

In one embodiment, the second solid functionalized product comprises 15 wt % to about 50 wt % of a functional group selected from oxygen, sulfur, phosphorous, nitrogen, or any combination thereof. In yet another embodiment, the second solid functionalized product is heated to a temperature of about 1,000° C. to about 2,900° C. during the carbonization process. In one embodiment, the solid nano-ordered carbon product has interspacing of about 3.4 Å to about 3.9 Å.

In one method, the method for preparing a nano-ordered carbon, comprises fractioning an initial refinery hydrocarbon product at a temperature of about 315° C. to about 540° C. during a fractionation process to produce a liquid refinery hydrocarbon product having a condensation index of 0.36 or less. This method exposes the liquid refinery hydrocarbon product to a first functionalization agent to produce a first solid functionalized product during a first functionalization process. This method also exposes the first solid functionalized product to a second functionalization agent to produce a second solid functionalized product during a second functionalization process. The method can also carbonize the second solid functionalized product to produce a solid nano-ordered carbon product during a carbonization process.

In one embodiment, the condensation index of the liquid refinery hydrocarbon product is about 0.32 to about 0.36. In one method, the liquid refinery hydrocarbon product has an average boiling point of about 315° C. to 540° C. In another embodiment, the liquid refinery hydrocarbon product has an average number of aromatic rings of about 2 to about 5 or about 3.20 to about 3.74.

In one method, the method for preparing a nano-ordered carbon, comprises fractioning an initial refinery hydrocarbon product during a fractionation process to produce a liquid refinery hydrocarbon product having a condensation index of 0.36 or less and an average number of aromatic rings of about 2 to about 5 or about 3.20 to about 3.74 and a heavy refinery hydrocarbon product having a condensation index of greater than 0.36. The method can expose the liquid refinery hydrocarbon product, the heavy refinery hydrocarbon product, or a mixture thereof to a first oxidizing agent to produce a first solid functionalized product during a first oxidation process, wherein the first solid functionalized product comprises about 1 wt % to less than 15 wt % of oxygen. The method can also purify the first solid functionalized product during a purification process. The method can also expose the first solid functionalized product to a second oxidizing agent to produce a second solid functionalized product during a second oxidation process, wherein the second solid functionalized product comprises 15 wt % to about 50 wt % of oxygen. The method also can carbonize the second solid functionalized product to produce a solid nano-ordered carbon product during a carbonization process.

FIG. 1 is a flowchart illustrating a method 100 containing operations 110-150 for preparing solid nano-ordered carbon products, according to one or more embodiments described and discussed herein. At operation 110, an initial refinery hydrocarbon product is fractionated during a fractionation process to produce at least a liquid refinery hydrocarbon product and a heavy refinery hydrocarbon product. At operation 120, the liquid refinery hydrocarbon product, the heavy refinery hydrocarbon product, or a mixture thereof is exposed to or otherwise combined with one or more first functionalization agents to produce the first solid functionalized product during a first functionalization process. At operation 130, the first solid functionalized product is purified during a purification process. At operation 140, the first solid functionalized product is exposed to or otherwise combined with one or more second functionalization agents to produce a second solid functionalized product during a second functionalization process. At operation 150, the second solid functionalized product is heated and carbonized to produce a solid nano-ordered carbon product during a carbonization process.

The initial liquid refinery hydrocarbon product can be or include any type of hydrocarbon which can be functionalized (e.g., oxidized or sulfurized) to form the functionalized solid product. The initial liquid refinery hydrocarbon product can be selected from the liquid components that are produced from a fluid catalytic cracking (FCC) unit, a coking reactor, ethylene cracking, coal coking, or even a distillation tower. The initial liquid refinery hydrocarbon product can be or include one or more FCC slurry oils, one or more heavy hydrocarbon streams containing polyaromatic hydrocarbons, one or more coker gas oils from a coking process, one or more vacuum or distillation gas oils from vacuum distillation, one or more ethylene tars, one or more cracking fluids, one or more coal tars, or any combination thereof. Typically, an FCC unit is used to convert high-boiling point, high molecular weight hydrocarbons into other products, such as FCC slurry oils. In one or more examples, the initial liquid refinery hydrocarbon product containing an FCC slurry oil has a boiling point of about 260° C. (500° F.) to about 704° C. (1,300° F.), an average molecular weight of about 100 to about 400, and an average number of aromatic rings of 2 to about 10. In some examples, the initial liquid refinery hydrocarbon product contains about 20 wt % to about 99 wt % of aromatic or polyaromatic molecules. In one or more examples, about 20% to about 80% of the carbon atoms in the initial liquid refinery hydrocarbon product belong to aromatic carbon family, as detected by nuclear magnetic resonance (NMR) spectroscopy. The FCC slurry oil is generally defined as lower viscosity, catalytic-cracked clarified oil that generally has a viscosity of about 48 cST to about 200 cST @ 122° F. In other examples, the initial liquid refinery hydrocarbon product containing an FCC slurry oil has an average molecular weight of greater than 400 to about 600 and an average number of aromatic rings greater than 10 to about 20. The use of the initial liquid refinery hydrocarbon products allows for solid nano-ordered carbon products to be produced on a mass scale, from a centralized and extremely low-cost feedstock.

At operation 110, the initial refinery hydrocarbon product can be heated and fractionated or otherwise separated during the fractionation process to produce at least a liquid refinery hydrocarbon product (e.g., median cut) and a heavy refinery hydrocarbon product (e.g., heavy cut). The initial refinery hydrocarbon product can be maintained under a vacuum or an inert atmosphere containing nitrogen ($N_2$), argon, helium, or combinations thereof during the fractionation process.

When under vacuum, the initial refinery hydrocarbon product can be maintained at a pressure from a minimum value of about 0.1 Torr, about 1 Torr, about 4 Torr, about 10 Torr, or about 20 Torr to a maximum value of about 30 Torr, about 50 Torr, about 75 Torr, about 100 Torr, about 150 Torr, about 200 Torr, or about 250 Torr during the fractionation process. For example, the initial refinery hydrocarbon product can be maintained at a pressure of about 0.1 Torr to about 250 Torr, about 1 Torr to about 250 Torr, about 1 Torr to about 150 Torr, about 1 Torr to about 100 Torr, about 1 Torr to about 75 Torr, about 1 Torr to about 50 Torr, about 1 Torr to about 30 Torr, about 1 Torr to about 20 Torr, about 1 Torr to about 10 Torr, about 4 Torr to about 250 Torr, about 4 Torr to about 150 Torr, about 4 Torr to about 100 Torr, about 4 Torr to about 75 Torr, about 4 Torr to about 50 Torr, about 4 Torr to about 30 Torr, about 4 Torr to about 20 Torr, about 4 Torr to about 10 Torr, about 20 Torr to about 250 Torr, about 20 Torr to about 150 Torr, about 20 Torr to about 100 Torr, about 20 Torr to about 75 Torr, about 20 Torr to about 50 Torr, or about 20 Torr to about 30 Torr during the fractionation process.

The initial refinery hydrocarbon product can heat to a temperature range from about 300° C. to 1,000° C. The liquid refinery hydrocarbon product or median cut fractionates at a temperature and/or has an average boiling point of about 315° C. to about 540° C. or about 400° C. to about 499° C., such as about 433° C. to about 499° C., about 450° C. to about 499° C., or about 475° C. to about 499° C. The heavy refinery hydrocarbon product or the heavy cut fractionates at a temperature and/or has an average boiling point of about 425° C. or greater, such as about 500° C. or greater, for example, about 450° C. to about 1,000° C., about 500° C. to about 1,000° C., about 500° C. to about 800° C., or about 500° C. to about 650° C. In one or more examples, the liquid refinery hydrocarbon product is fractionated at a temperature of about 400° C. to about 499° C. or about 433° C. to about 499° C. and the heavy refinery hydrocarbon product is fractionated at a temperature of about 500° C. or greater. In some examples, the liquid petroleum product has an average boiling point of about 315° C. to about 540° C. and the heavy refinery hydrocarbon product has an average boiling point of about 425° C. to about 650° C.

The liquid refinery hydrocarbon product and the heavy refinery hydrocarbon product contain mixtures of molecules having various amounts of aromatic rings. The liquid refinery hydrocarbon product and the heavy refinery hydrocarbon product both contain molecules containing 1 ring (1RA), 2 rings (2RA), 3 rings (3RA), 4 rings (4RA), 5 rings (5RA), 6 rings (6RA), 7 rings (7RA), and more rings, but at different quantities and ratios. In one or more embodiments, the liquid refinery hydrocarbon product has an average number of aromatic rings of about 2 to about 5, about 2.5 to about 4.5, about 2.8 to about 4, about 3.00 to about 3.74, about 3.20 to about 3.74, or about 3.40 to about 3.74. In some embodiments, the heavy refinery hydrocarbon product has an average number of aromatic rings of about 3 to about 7, about 3 to about 6, about 3 to about 5, about 3.5 to about 4.5, about 3.75 to about 4.00, about 3.75 to about 4.20, about 3.75 to about 4.50.

Due to the different types and amounts of polyaromatic ring compounds, the liquid refinery hydrocarbon typically was a lower condensation index than the heavy refinery hydrocarbon product. The condensation index (CI) is defined as a ratio of the bridgehead carbon atoms of the polyaromatic rings over the total aromatic carbon atoms (including bridgehead, substituted, and tertiary carbon atoms) of the polyaromatic rings. Carbon atoms of non-aromatic functional groups are not included in the CI value. In one or more embodiments, the liquid refinery hydrocarbon product or the median cut has a condensation index of 0.36 or less and the heavy refinery hydrocarbon product or the heavy cut has a condensation index of greater than 0.36. The liquid refinery hydrocarbon product can have a condensation index of about 0.32, about 0.325, about 0.33, about 0.335, about 0.34, about 0.345, about 0.35, about 0.355, or 0.36. The heavy refinery hydrocarbon product can have a condensation index of about 0.37, about 0.375, about 0.38, about 0.385, about 0.39, about 0.395, about 0.40, about 0.405, about 0.41, about 0.415, about 0.42, or greater. In one or more examples, the liquid refinery hydrocarbon product has a condensation index of about 0.32 to 0.36 and the heavy refinery hydrocarbon product has a condensation index of greater than 0.36 to about 0.42. In other examples, the liquid refinery hydrocarbon product has a condensation index of about 0.32 to about 0.35 and the heavy refinery hydrocarbon product has a condensation index of about 0.37 to about 0.42.

In some embodiments, prior to the fractionation process, the initial refinery hydrocarbon product can be pretreated by filtration and/or adding chemical agent to remove catalyst fine particles that are entrained during FCC operation in order to produce the refinery hydrocarbon product (e.g., the liquid refinery hydrocarbon product, the heavy refinery hydrocarbon product, or a mixture thereof). The initial refinery hydrocarbon product can be further hydrotreated to remove sulfur and/or nitrogen while producing the liquid refinery hydrocarbon product.

At operation 120, the liquid refinery hydrocarbon product, the heavy refinery hydrocarbon product, or a mixture thereof can be exposed to or otherwise combined with one or more first functionalization agents during the first functionalization process to produce the first solid functionalized product. In one or more examples, the liquid refinery hydrocarbon product is combined with the first functionalization agents during the first functionalization process to produce the first solid functionalized product. In other examples, the heavy refinery hydrocarbon product is combined with the first functionalization agents during the first functionalization process to produce the first solid functionalized product. In some examples, a mixture or blend containing the liquid refinery hydrocarbon product and the heavy refinery hydrocarbon product is combined with the first functionalization agents during the first functionalization process to produce the first solid functionalized product. The mixture containing the liquid refinery hydrocarbon product and the heavy refinery hydrocarbon product can have a weight ratio of about 99:1, about 90:10, about 80:20, about 70:30, about 60:40, about 50:50, about 40:60, about 30:70, about 20:80, about 10:90, or about 1:99 of the liquid refinery hydrocarbon product relative to the heavy refinery hydrocarbon product.

The first functionalization agent contains at least one element selected from oxygen, sulfur, phosphorous, nitrogen, or any combination thereof. It is theorized that the crosslinking of these functional groups will increase the softening point of the refinery hydrocarbon product to at least 100° C., 120° C., 150° C., even greater than 300° C. In one or more embodiments, the first functionalization process can be or include an air oxidation process, an acid treatment process, a sulfurization process, a peroxide oxidation process, an organic compound oxidation process, a crosslinking process, or any combination thereof. In some examples, the first functionalization agent is selected from oxygen gas ($O_2$), air, oxygen-enriched air, sulfuric acid, nitric acid, phosphoric acid, hydrogen peroxide, elemental sulfur ($S_8$), elemental phosphorus ($P_4$, such as white phosphorus or red phosphorus), one or more organic phosphines, or any combination thereof. Nitric acid, as the first functionalization agent, can be used as an oxidizing agent, a nitriding agent, or both.

In one or more examples, the liquid refinery hydrocarbon product, the heavy refinery hydrocarbon product, or a mixture thereof can be catalyzed heat soaked with addition of small amount of oxidizing agents such as sulfuric acid, nitric acid, or hydrogen peroxide. In other examples, the first functionalization agent can be or include one or more oxygen-containing organic compounds which can be combined with the liquid refinery hydrocarbon product, the heavy refinery hydrocarbon product, or a mixture thereof during an organic compound oxidation process. Exemplary oxygen-containing organic compounds can be or includes one or more organic peroxides, one or more organic acids, one or more anhydrides, one or more esters, one or more ketones, one or more aldehydes, or any combination thereof. In some examples, the first functionalization agent can be or include one or more crosslinkers, such as one or more vinyl monomers during a crosslinking process. Exemplary vinyl monomers can be or include divinylbenzene, diallyl phthalate (DAP), diallyl isophthalate (DAIP), or any combination thereof.

The reaction mixture containing the refinery hydrocarbon product (e.g., the liquid refinery hydrocarbon product, the heavy refinery hydrocarbon product, or a mixture thereof) and the first functionalization agent is heated to a process temperature during the first functionalization process. The process temperature can be from a minimum value of about 50° C., about 100° C., about 150° C., about 200° C., about 250° C., or about 300° C. to a maximum value of about 350° C., about 400° C., about 500° C., about 600° C., about 700° C., about 800° C., about 900° C., about 950° C., about 990° C., or less than 1,000° C. during the first functionalization process. For example, the process temperature can be about 50° C. to less than 1,000° C., about 100° C. to less than 1,000° C., about 200° C. to less than 1,000° C., about 350° C. to less than 1,000° C., about 500° C. to less than 1,000° C., about 750° C. to less than 1,000° C., about 900° C. to less than 1,000° C., about 50° C. to about 900° C., about 100° C. to about 900° C., about 200° C. to about 900° C., about 350° C. to about 900° C., about 500° C. to about 900° C., about 750° C. to about 900° C., about 50° C. to about 700° C., about 100° C. to about 700° C., about 200° C. to about 700° C., about 350° C. to about 700° C., about 500° C. to about 700° C., about 600° C. to about 700° C., about 50° C. to about 500° C., about 100° C. to about 500° C., about 200° C. to about 500° C., about 250° C. to about 500° C., about 300° C. to about 500° C., or about 350° C. to about 500° C. during the first functionalization process.

In one or more examples, the initial functionalizing occurs via air oxidation at a temperature of about 200° C. to about 375° C. during the first functionalization process. In other examples, the air oxidation can occur at a temperature of about 325° C. to about 375° C., such as from about 340° C. to about 360° C. during the first functionalization process.

The reaction mixture containing the refinery hydrocarbon product (e.g., the liquid refinery hydrocarbon product, the heavy refinery hydrocarbon product, or a mixture thereof) and the first functionalization agent is heated and/or maintained at the process temperature for a time period from a minimum value of about 0.1 hours, about 0.25 hours, about 0.5 hours, about 0.75 hours, about 1 hour, about 1.5 hours, about 2 hours, or about 2.5 hours to a maximum value of about 3 hours, about 4 hours, about 5 hours, about 6 hours, about 8 hours, about 10 hours, about 12 hours, about 15 hours, about 18 hours, about 20 hours, about 24 hours, or longer during the first functionalization process.

In one or more embodiments, the first solid functionalized product can be ground, milled, or otherwise reduced into micro-sized particles prior to going through the purification process. Micro-sized particles can generally have a particle size of about 1 μm to about 1,000 μm, about 10 μm to about 500 μm, about 100 μm to about 400 μm, or less than 250 μm. In one or more examples, the first solid functionalized product is ground into micro-sized particles having an average particle size of less than 250 μm prior to the purification process and/or the second functionalization process. In other examples, the first solid functionalized product is ground into micro-sized particles after the purification process and before the second functionalization process.

At operation 130, the first solid functionalized product is purified and/or filtered during the purification process. One of the benefits of restricting the initial functionalization to a maximum functional group weight percentage within the first solid functionalized product is that it allows for an opportunity to purify the first solid functionalized product of contaminants prior to a secondary functionalization of the first solid functionalized product. Exemplary contaminants can be or include unreacted components such as one or more aromatic or polyaromatic compounds with one or more long side chains, a paraffinic compound, or a combination thereof. It is theorized that removal of these contaminants has an adverse effect on the end product of the solid nano-ordered carbon.

In one or more examples, the first solid functionalized product is exposed to a solvent extraction during the purification process. The solvent can be or include any solvent or combination of solvents which the first solid functionalized product is relatively insoluble in so that the contaminants can be later readily removed or otherwise separated from the first solid functionalized product. The solvent can be or include xylene, toluene, benzene, pyridine, mesitylene, benzyl alcohol, benzonitrile, nitrobenzene, one or more alkanes, or any combination thereof. Exemplary alkanes can be or include butane, pentane, hexane, heptane, octane, nonane, decane, undecane, dodecane, isomers thereof, or any combination thereof.

In one or more examples, the first solid functionalized product is purified by solvent extraction with a non-polar solvent such as heptane to remove contaminants. In this example since the first solid functionalized product is purified by a non-polar solvent, adequate time and/or process can be allocated to ensure that the first solid functionalized product is dried prior to secondary functionalization.

The first solid functionalized product contains one or more functional groups selected from oxygen, sulfur, phosphorous, nitrogen, or any combination thereof. As such, the first solid functionalized product can be or include an oxidized product, a sulfurized product, a phosphorized product, a nitrided product, or any combination thereof. The first solid functionalized product has a concentration of the functional group from a minimum value of about 1 wt %, about 2 wt %, about 2.5 wt %, about 3 wt %, about 4 wt %, about 5 wt %, or about 6 wt % to a maximum value of about 7 wt %, about 8 wt %, about 9 wt %, about 10 wt %, about 11 wt %, about 12 wt %, about 13 wt %, about 14 wt %, about 14.8 wt %, or less than 15 wt %. For example, the first solid functionalized product contains about 1 wt % to less than 15 wt %, about 2 wt % to less than 15 wt %, about 3 wt % to less than 15 wt %, about 5 wt % to less than 15 wt %, about 6 wt % to less than 15 wt %, about 8 wt % to less than 15 wt %, about 10 wt % to less than 15 wt %, about 12 wt % to less than 15 wt %, about 1 wt % to about 12 wt %, about 2 wt % to about 12 wt %, about 3 wt % to about 12 wt %, about 5 wt % to about 12 wt %, about 6 wt % to about 12 wt %, about 8 wt % to about 12 wt %, about 10 wt % to about 12 wt %, about 1 wt % to about 10 wt %, about 2 wt % to about 10 wt %, about 3 wt % to about 10 wt %, about 5 wt % to about 10 wt %, about 6 wt % to about 10 wt %, about 8 wt % to about 10 wt %, about 1 wt % to about 7 wt %, about 2 wt % to about 7 wt %, about 3 wt % to about 7 wt %, or about 5 wt % to about 7 wt % of the functional group selected from oxygen, sulfur, phosphorous, nitrogen, or any combination thereof.

As a result of the initial functionalization, the first solid functionalized product can have an average molecular weight increased from about 400 to about 1,500. Also, in some embodiments, the initial functionalization provides the first solid functionalized product to have up to about 10 wt % or up to about 15 wt % of the functional group. For example, the first solid functionalized product to have about 2 wt % to about 10 wt % of the functional group.

At operation 140, the first solid functionalized product is exposed to or otherwise combined with one or more second functionalization agents to produce a second solid functionalized product during a second functionalization process. The second functionalization agent contains at least one element selected from oxygen, sulfur, phosphorous, nitrogen, or any combination thereof. In one or more examples, the first functionalization agent and the second functionalization agent have different compositions. Alternatively, in other examples, the first functionalization agent and the second functionalization agent have the same composition.

In some embodiments, the processes of performing the first functionalization process and the second functionalization process can be the same or different. In one or more embodiments, the second functionalization process can be or include an air oxidation process, an acid treatment process, a sulfurization process, a peroxide oxidation process, an organic compound oxidation process, a crosslinking process, or any combination thereof. In some examples, the second functionalization agent can be or include oxygen gas ($O_2$), air, oxygen-enriched air, sulfuric acid, nitric acid, phosphoric acid, hydrogen peroxide, elemental sulfur ($S_8$), elemental phosphorus ($P_4$, such as white phosphorus or red phosphorus), one or more organic phosphines, or any combination thereof. Nitric acid, as the second functionalization agent, can be used as an oxidizing agent, a nitriding agent, or both.

In one or more examples, the first solid functionalized product can be catalyzed heat soaked with addition of small amount of oxidizing agents such as sulfuric acid, nitric acid, or hydrogen peroxide. In other examples, the second functionalization agent can be or include one or more oxygen-containing organic compounds which is combined with the first solid functionalized product during an organic compound oxidation process. Exemplary oxygen-containing organic compounds can be or includes one or more organic peroxides, one or more organic acids, one or more anhydrides, one or more esters, one or more ketones, one or more aldehydes, or any combination thereof. In some examples, the second functionalization agent can be or include one or more crosslinkers, such as one or more vinyl monomers during a crosslinking process. Exemplary vinyl monomers can be or include divinylbenzene, diallyl phthalate (DAP), diallyl isophthalate (DAIP), or any combination thereof.

In one embodiment, the secondary functionalization can occur through air oxidation during the second functionalization process. For example, the secondary functionalization of the first solid functionalized product can be deeply oxidized with air in powder drying equipment. The oxidation temperature can range from about 250° C. to about 350° C. In some examples, this secondary functionalization can increase the oxygen content of the intermediate product from about 15 wt % to about 30 wt %. The second solid functionalized product promotes crosslinking which prevents the growth or long-range ordered carbon structure during carbonization and subsequently helps in the formation of the solid nano-ordered carbon product.

The reaction mixture containing the first solid functionalized product and the second functionalization agent is heated to a process temperature during the second functionalization process. The process temperature can be from a minimum value of about 50° C., about 100° C., about 150° C., about 200° C., about 250° C., or about 300° C. to a maximum value of about 350° C., about 400° C., about 500° C., about 600° C., about 700° C., about 800° C., about 900° C., about 950° C., about 990° C., or less than 1,000° C. during the second functionalization process. For example, the process temperature can be about 50° C. to less than 1,000° C., about 100° C. to less than 1,000° C., about 200° C. to less than 1,000° C., about 350° C. to less than 1,000° C., about 500° C. to less than 1,000° C., about 750° C. to less than 1,000° C., about 900° C. to less than 1,000° C., about 50° C. to about 900° C., about 100° C. to about 900° C., about 200° C. to about 900° C., about 350° C. to about 900° C., about 500° C. to about 900° C., about 750° C. to about 900° C., about 50° C. to about 700° C., about 100° C. to about 700° C., about 200° C. to about 700° C., about 350° C. to about 700° C., about 500° C. to about 700° C., about 600° C. to about 700° C., about 50° C. to about 500° C., about 100° C. to about 500° C., about 200° C. to about 500° C., about 250° C. to about 500° C., about 300° C. to about 500° C., or about 350° C. to about 500° C. during the second functionalization process.

In one or more examples, a reaction mixture containing the first solid functionalized product and the second functionalization agent is heated to a process temperature of about 200° C. to about 400° C. or about 250° C. to about 350° C. during the second functionalization process. In some examples, the secondary functionalizing occurs via air oxidation at a temperature of about 200° C. to about 375° C. during the second functionalization process. In other examples, the air oxidation can occur at a temperature of about 325° C. to about 375° C., such as from about 340° C. to about 360° C. during the second functionalization process.

The reaction mixture containing the first solid functionalized product and the second functionalization agent is heated and/or maintained at the process temperature for a time period from a minimum value of about 0.1 hours, about 0.25 hours, about 0.5 hours, about 0.75 hours, about 1 hour, about 1.5 hours, about 2 hours, or about 2.5 hours to a maximum value of about 3 hours, about 4 hours, about 5 hours, about 6 hours, about 8 hours, about 10 hours, about 12 hours, about 15 hours, about 18 hours, about 20 hours, about 24 hours, or longer during the second functionalization process.

The second solid functionalized product contains one or more functional groups selected from oxygen, sulfur, phosphorous, nitrogen, or any combination thereof. As such, the second solid functionalized product can be or include an oxidized product, a sulfurized product, a phosphorized product, a nitrided product, or any combination thereof. The second solid functionalized product has a concentration of the functional group from a minimum value of 15 wt %, about 16 wt %, about 18 wt %, about 20 wt %, about 22 wt %, about 24 wt %, or about 25 wt % to a maximum value of about 26 wt %, about 28 wt %, about 30 wt %, about 32 wt %, about 35 wt %, about 38 wt %, about 40 wt %, about 42 wt %, about 45 wt %, about 50 wt %, or greater. For example, the second solid functionalized product contains 15 wt % to about 50 wt %, 15 wt % to about 45 wt %, 15 wt % to about 40 wt %, 15 wt % to about 35 wt %, 15 wt % to about 30 wt %, 15 wt % to about 25 wt %, 15 wt % to about 22 wt %, 15 wt % to about 20 wt %, 15 wt % to about 18 wt %, about 18 wt % to about 50 wt %, about 18 wt % to about 45 wt %, about 18 wt % to about 40 wt %, about 18 wt % to about 35 wt %, about 18 wt % to about 30 wt %, about 18 wt % to about 25 wt %, about 18 wt % to about 22 wt %, about 18 wt % to about 20 wt %, about 20 wt % to about 50 wt %, about 20 wt % to about 45 wt %, about 20 wt % to about 40 wt %, about 20 wt % to about 35 wt %, about 20 wt % to about 30 wt %, about 20 wt % to about 25 wt %, or about 20 wt % to about 22 wt % of the functional group selected from oxygen, sulfur, phosphorous, nitrogen, or any combination thereof.

At operation 150, the second solid functionalized product is further processed to produce one or more solid nano-ordered (NOC) carbon products during the carbonization process. For example, the second solid functionalized product can be heated and carbonized to produce the solid nano-ordered carbon product during the carbonization process. The second solid functionalized product can be heated and maintained under an atmosphere of a relatively inert gas (e.g., dinitrogen, argon, helium, or mixtures thereof) or can be maintained under a vacuum while producing the solid nano-ordered carbon product during the carbonization process. The solid nano-ordered carbon products can be or include hard carbon, as well as other types of carbon materials, such as soft carbon, glassy carbon, porous carbon, or any combination of these carbon materials.

The carbonization process can be performed in a furnace (e.g., graphitization furnace or carbonization furnace), a thermal chamber, a reactor, or another type of vessel or container. In one or more embodiments, the second solid functionalized product is heated to a temperature of about 800° C. or greater for about 1 hour to about 5 hours during the carbonization process to produce the solid nano-ordered carbon product used as the anode carbon material. The second solid functionalized product is heated to a temperature from a minimum value of about 800° C., about 900° C., about 1,000° C., about 1,200° C., or about 1,400° C. to a maximum value of about 1,500° C., about 1,650° C., about 1,800° C., about 2,000° C., about 2,300° C., about 2,500° C., about 2,700° C., about 2,900° C., about 3,000° C., or greater during the carbonization process. For example, the second solid functionalized product is heated to a temperature of about 800° C. to about 3,000° C., about 800° C. to about 2,500° C., about 800° C. to about 2,000° C., about 800° C. to about 1,800° C., about 800° C. to about 1,500° C., about 800° C. to about 1,000° C., about 1,000° C. to about 3,000° C., about 1,000° C. to about 2,900° C., about 1,000° C. to about 2,500° C., about 1,000° C. to about 2,200° C., about 1,000° C. to about 2,000° C., about 1,000° C. to about 1,800° C., about 1,000° C. to about 1,500° C., about 1,000° C. to about 1,200° C., about 1,400° C. to about 3,000° C., about 1,400° C. to about 2,500° C., about 1,400° C. to about 2,000° C., or about 1,400° C. to about 1,800° C. during the carbonization process.

In one or more examples, the carbonization process includes heating the second solid functionalized product at a temperature of about 1,000° C. to about 3,000° C. for about 0.5 hours to about 10 hours to produce the solid nano-ordered carbon product. In other examples, the carbonization process includes heating the second solid functionalized product at a temperature of about 1,200° C. to about 2,500° C. for about 1 hour to about 5 hours to produce the solid nano-ordered carbon product. In some examples, the carbonization process includes heating the second solid functionalized product at a temperature of about 1,500° C. to about 2,000° C. for about 2 hours to about 4 hours to produce the solid nano-ordered carbon product.

The carbonization process can produce the solid nano-ordered carbon product with interspacing of about 3.4 Å or greater. For example, the solid nano-ordered carbon product can have an interspacing of about 3.4 Å, about 3.5 Å, about 3.6 Å, about 3.7 Å, about 3.8 Å, about 3.9 Å, or greater. In some examples, the solid nano-ordered carbon product can have an interspacing of about 3.4 Å to about 3.9 Å, about 3.5 Å to about 3.9 Å, about 3.6 Å to about 3.9 Å, about 3.7 Å to about 3.9 Å, about 3.8 Å to about 3.9 Å, about 3.4 Å to about 3.7 Å, about 3.5 Å to about 3.7 Å, or about 3.6 Å to about 3.7 Å.

In other embodiments, the carbonization process can also produce a solid nano-ordered carbon product with nanopores encased by curved or entangled graphene sheets. The carbonization process can be conducted in a one-step or a multi-step process such as a two-step process. In a one-step process the carbonization occurs immediately at the desire temperature range. In a multi-step process the intermediate products can be pre-carbonized at a temperature, such as less than 1,200° C. in a two-step process, to remove volatiles. The next step in the multi-step process can be to anneal the pre-carbonized intermediate product at a greater temperature to finalize forming the solid nano-ordered carbon product.

The solid nano-ordered carbon products can be prepared from the liquid refinery hydrocarbon product at a product weight yield of about 50%, about 55%, about 60%, about 65%, about 70%, about 75%, about 80%, about 85%, about 90%, or greater during the method 100. For example, the solid nano-ordered carbon products can be prepared from the liquid refinery hydrocarbon product at a product weight yield of about 50% to about 90%, about 60% to about 90%, about 70% to about 90%, about 80% to about 90%, about 50% to about 75%, about 60% to about 75%, or about 70% to about 75% during the method 100.

The method 100 for preparing the solid nano-ordered carbon can include and/or omit different operations 110-150 and/or processes as described and discussed herein. The method 100 can also include other processes before, after, in between, or during any of the operations 110-150. In one or more examples, the method 100 includes fractioning the initial refinery hydrocarbon product during the fractionation process to produce the liquid refinery hydrocarbon product having the condensation index of 0.36 or less and the heavy refinery hydrocarbon product having the condensation index of greater than 0.36 (operation 110). The method 100 further includes exposing the liquid refinery hydrocarbon product, the heavy refinery hydrocarbon product, or a mixture thereof to the first functionalization agent to produce the first solid functionalized product during the first functionalization process (operation 120) and purifying the first solid functionalized product during the purification process (operation 130). The method 100 also includes exposing the first solid functionalized product to the second functionalization agent to produce the second solid functionalized product during the second functionalization process (operation 140) and carbonizing the second solid functionalized product to produce the solid nano-ordered carbon product during the carbonization process (operation 150).

In other examples, the method 100 includes fractioning the initial refinery hydrocarbon product at the temperature of about 315° C. to about 540° C. during the fractionation process to produce the liquid refinery hydrocarbon product having the condensation index of 0.36 or less (operation 110) and exposing the liquid refinery hydrocarbon product to the first functionalization agent to produce the first solid functionalized product during the first functionalization process (operation 120). The method 100 further includes exposing the first solid functionalized product to the second functionalization agent to produce the second solid functionalized product during the second functionalization process (operation 140) and carbonizing the second solid functionalized product to produce the solid nano-ordered carbon product during the carbonization process (operation 150).

In some examples, the method 100 includes fractioning the initial refinery hydrocarbon product during the fractionation process to produce the liquid refinery hydrocarbon product having the condensation index of 0.36 or less and the average number of aromatic rings of about 2 to about 5 or about 3.20 to about 3.74 and the heavy refinery hydrocarbon product having the condensation index of greater than 0.36 (operation 110). The method 100 further includes exposing the liquid refinery hydrocarbon product, the heavy refinery hydrocarbon product, or a mixture thereof to the first oxidizing agent to produce the first solid functionalized product during the first oxidation process (operation 120). The first solid functionalized product contains about 1 wt % to less than 15 wt % of oxygen. The method 100 also includes purifying the first solid functionalized product during the purification process (operation 130) and exposing the first solid functionalized product to the second oxidizing agent to produce the second solid functionalized product during the second oxidation process (operation 140). The second solid functionalized product contains 15 wt % to about 50 wt % of oxygen. The method 100 also includes carbonizing the second solid functionalized product to produce the solid nano-ordered carbon product during the carbonization process (operation 150).

Figure 2:
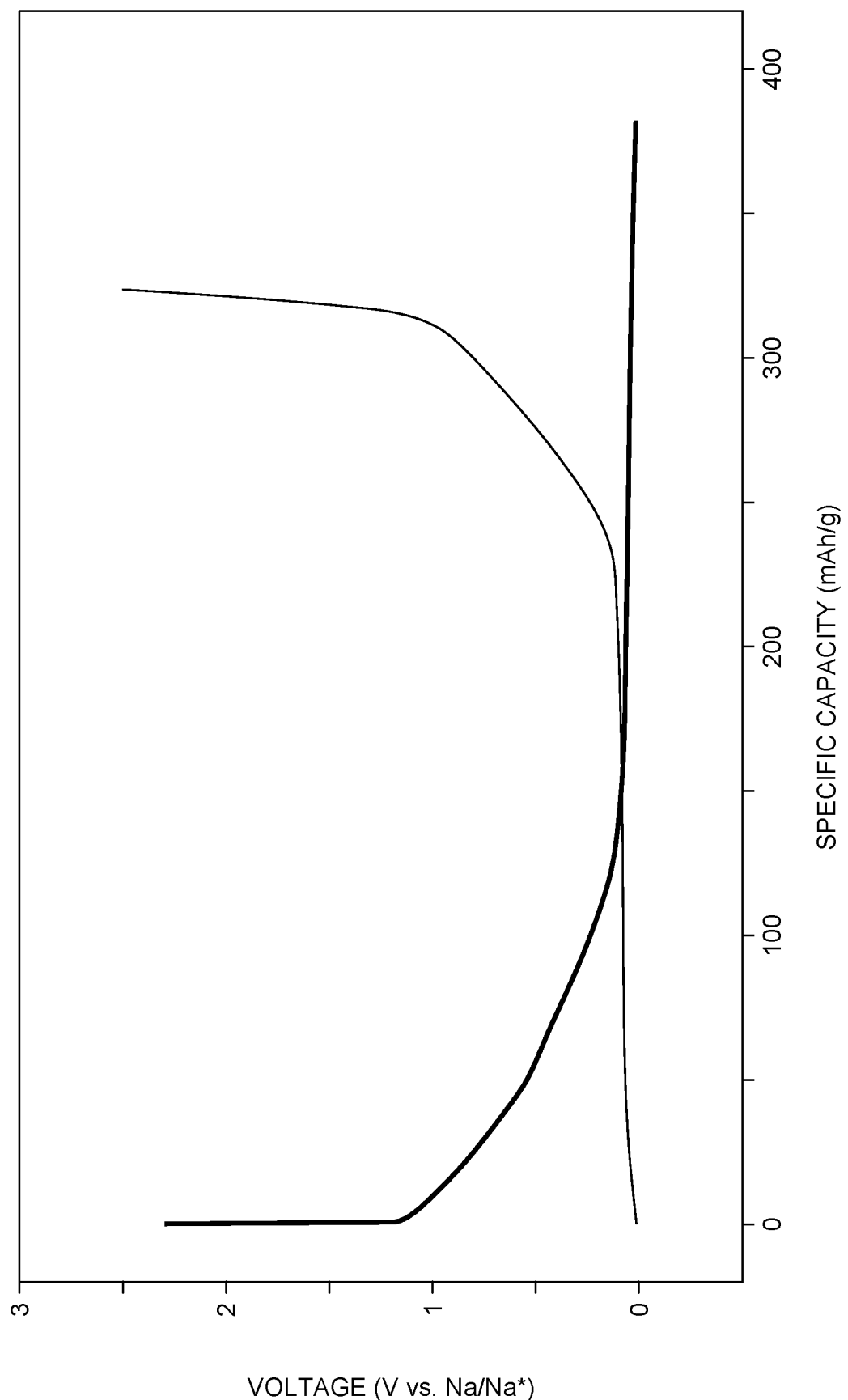
FIG. 2 is a graph showing discharge/charge profiles during the first cycle of battery half-cells containing solid nano-ordered carbon products prepared by methods described and discussed herein.

In one or more embodiments, the solid nano-ordered carbon product can be used to reversibly store sodium ions in sodium batteries. The solid nano-ordered carbon product can produce 300+ mAh/g specific capacity with a first cycle efficiency of greater than 82% to about 96% during a first cycle test in a sodium ion batteries half-cell test. FIG. 2 is a graph showing discharge/charge profiles during the first cycle. The initial sodiation (discharge as shown by the thicker line) started at about 1 V to about 1.2 V, usually due to the interfacial interaction between electrolyte solution and carbon surface. The potential dropped as the sodium ion storage capacity increased until the profile came to a turning point where the potential started to change in a much slower pace while the capacity soared. Therefore, the total capacity for sodium ion storage consists of two fractions: capacity in the sloping section (>0.15 V) and capacity in the plateau region (<0.15 V). When charged back, the potential-capacity profile (shown as the thinner line) proceeded in a reversed order: plateau region followed by sloping region. The achieved desodiation capacity is less than sodiation capacity due to irreversible side reactions. The ratio of desodiation capacity to sodiation capacity is referred to as first cycle efficiency. In other embodiments, it has been shown that solid nano-ordered carbon product can be used to reversibly store lithium ions in lithium-ion batteries.

EXAMPLES

In order to provide a better understanding of the foregoing discussion, the following non-limiting examples are offered. Although the examples can be directed to specific embodiments, they are not to be viewed as limiting the scope of the invention in any specific respect.

Five different methods of producing solid nano-ordered carbon were done

In Example 1, 50 g slurry oil fraction (>440° C.) was heat soaked at 350-450° C. and 10-150 psig for 2-10 h in a Parr reactor which was purged with nitrogen during the process. The precursor usually has a higher average molecular weight than the feedstock. This precursor was then oxidized with static air in a muffle furnace. The furnace temperature ramped to a desired temperature (from about 300° C. to about 375° C.) at 3° C./min and hold for 3 h. The oxidized material was carbonized in a nitrogen atmosphere at ambient pressure using a laboratory tube furnace (Lindberg/Blue M™ HTF55322A) and a programmed temperature profile (ramp to 1400° C. at 5° C./min and hold for 2 h). The nano-ordered carbon product generated from Example 1 is designated as NOC I.

Example 2

In Example 2, around 25 g slurry oil heavy fraction (>440° C.) was initially functionalized into first solid functionalized product with sufficient oxygen content and softening point by mild oxidation. This step was accomplished in a muffle furnace with natural convection of air at a temperature from about 200-350° C. for about 2-24 hours. The first solid functionalized product should contain up to 5 wt % of oxygen and have a softening point higher than 120° C. The initially oxidized product was crushed with ball mill into powder (D50=20-200 μm). The powder was fully oxidized in a muffle furnace with natural convection of air, at a temperature from about 280° C. to about 320° C. for about 3 hours, to further functionalize and crosslink the molecules. The oxygen content of the deeply oxidized product ranges from 20 wt % to about 35 wt %. Lastly, the deeply oxidized material was carbonized in a nitrogen atmosphere at ambient pressure using a laboratory tube furnace (Lindberg/Blue M™ HTF55322A) and a programmed temperature profile (ramp to 1400° C. at 5° C./min and hold for 2 h). The nano-ordered carbon product generated from Example 2 is designated as NOC II.

Example 3

In Example 3, around 25 g slurry oil heavy fraction (>440° C.) was initially functionalized into first solid functionalized product with sufficient oxygen content and softening point by mild oxidation. This step was accomplished in a muffle furnace with natural convection of air at a temperature from about 200-350° C. for about 2-24 hours. The first solid functionalized product should contain up to 5 wt % of oxygen and have a softening point higher than 120° C. The first functionalized solid product was then purified by solvent extraction. The intermediate was soaked in heptane in a weight ratio of 1:10 at 50-60° C. for 2 hours with continuous stirring. The solid in the suspension was then filtered out and dried at 80° C. overnight. The purified product was crushed with ball mill into powder (D50=20-200 μm). The powder was fully oxidized in a muffle furnace with natural convection of air, at a temperature from about 280° C. to about 320° C. for about 3 hours, to further functionalize and crosslink the molecules. The oxygen content of the deeply oxidized product ranges from 20 wt % to about 35 wt %. Lastly, the deeply oxidized material was carbonized in a nitrogen atmosphere at ambient pressure using a laboratory tube furnace (Lindberg/Blue M™ HTF55322A) and a programmed temperature profile (ramp to 1400° C. at 5° C./min and hold for 2 h). The nano-ordered carbon product generated from Example 3 is NOC II type.

Example 4

In Example 4, The heavy fraction (about 500+° C.) of slurry oils were used as feedstocks for preparing hard carbon products. For each test, the following process was performed: 1) fully dissolve the slurry oil in xylene (xylene/slurry oil weight ratio 4:1) to form a homogenous mixture; 2) heat the mixture to 65° C. in a silicon oil bath; 3) add concentrated H2SO4 (98 wt. %) into the mixture with acid to slurry oil weight ratio of 0.6:1; 4) heat the resulting mixture to the boiling point of xylene (140° C.-150° C.) within 20 min to complete the reaction; 5) additional boiling xylene (xylene/slurry oil weight ratio 2:1) was added to the boiling mixture upon the completion of reaction to fully precipitate the xylene insoluble products; 6) remove the heat and cool the mixture to room temperature (about 23° C.); 7) filter the mixture, wash with xylene, collect and dry the solid product; 8) the solid powder was further oxidized in a muffle furnace with natural convection of air, at a temperature from about 280° C. to about 320° C. for about 3 hours, to further functionalize and crosslink the molecules; 9) heat the resulting powder in a tube furnace at a rate of 5° C. /min to 1,400° C. and hold for two hours under a nitrogen atmosphere to complete carbonization. The nano-ordered carbon product generated from Example 4 is NOC II type.

Example 5

In Example 5, About 100 grams of heavy fraction (about 500+° C.) of slurry oil was heated to 100° C. and charged into a 300 mL Parr reactor vessel and 50 g of sulfur powder (99.98%, Sigma-Aldrich®) was then added to the same vessel. The mixture was manually mixed for 10 min before the vessel was installed and sealed. Sulfurization was carried out in nitrogen with controlled pressure between 50 psi and 100 psi during slow and controlled temperature ramping from room temperature to 200° C., after which the back pressure regulator was completely closed and major reaction seemed to happen based on observed pressure hikes until heating was discontinued at 260° C. The sulfurized slurry material collected as small solid pieces was balled milled and sieved through 50 mesh to obtain a powder material. The powder material was dispersed in heptane heated on a hot plate set at 60° C. for 3 hours with continuous stirring, after which the solid in the suspension was filtered out and dried at 60° C. in vacuum overnight. The dried sample was heated in a muffle furnace for oxidation at the desired temperature for a certain duration. The oxidized powder was heated in a tube furnace at a rate of 5° C./min to 1,400° C. and hold for two hours under a nitrogen atmosphere to complete carbonization. The nano-ordered carbon product generated from Example 5 is NOC II type.

Tests

The following tests were run on the nano-ordered carbon materials made from Examples 1 and 2. TGA-TPO Analysis of pre-functionalized liquid refinery hydrocarbon product. Samples for XRD analysis were packed loosely onto a silicon wafer low-background XRD sample holder and leveled to achieve a flat surface. XRD data was acquired on a diffractometer operated in θ-θ geometry with a copper X-ray source (Cu ka λ=1.54059 Å), divergent beam primary beam X-ray optics, and a Vantec1 position sensitive detector. Scans were acquired from 5° to 85° 2θ with a 0.03189° step size.

Electrochemical Tests

The electrochemical tests were performed on a battery cycling tester in a voltage range of 0.01 V to 2.5 V. The electrical charge passed during charging and discharging on each cycle was recorded and used to calculate the specific capacity and coulombic efficiency. All the tests were conducted at ambient temperature.

Coin cells for the electrochemical tests were made form disks with 1.5 cm diameter were punched out from the electrode films using a die cutter. The mass loading of active materials on these disks varied from 5 mg/disc to 6 mg/disc. Each coin cell was prepared in an argon-filled glovebox by sequentially stacking a Na metal as anode, separators, an electrode disk as cathode, a stainless steel disk spacer, and a wave spring in a bottom can. The electrolyte was added to the separators before the electrode disk was stacked. An electrolyte of 1 M $NaPF_6$ in 50 vol % ethylene carbonate and 50 vol % dimethyl carbonates was used. After the top can was dropped onto the stack, the assembly was transferred to the coin cell crimper and crimped together.

Electrodes for the coin cells were prepared from casting a mixture of the nano-ordered carbon, alginate binder, and carbon black in a weight ratio of 90:5:5 in water onto a carbon-coated aluminum substrate and drying in a vacuum oven at 80° C. for 1 hour.

Results

Figure 3:
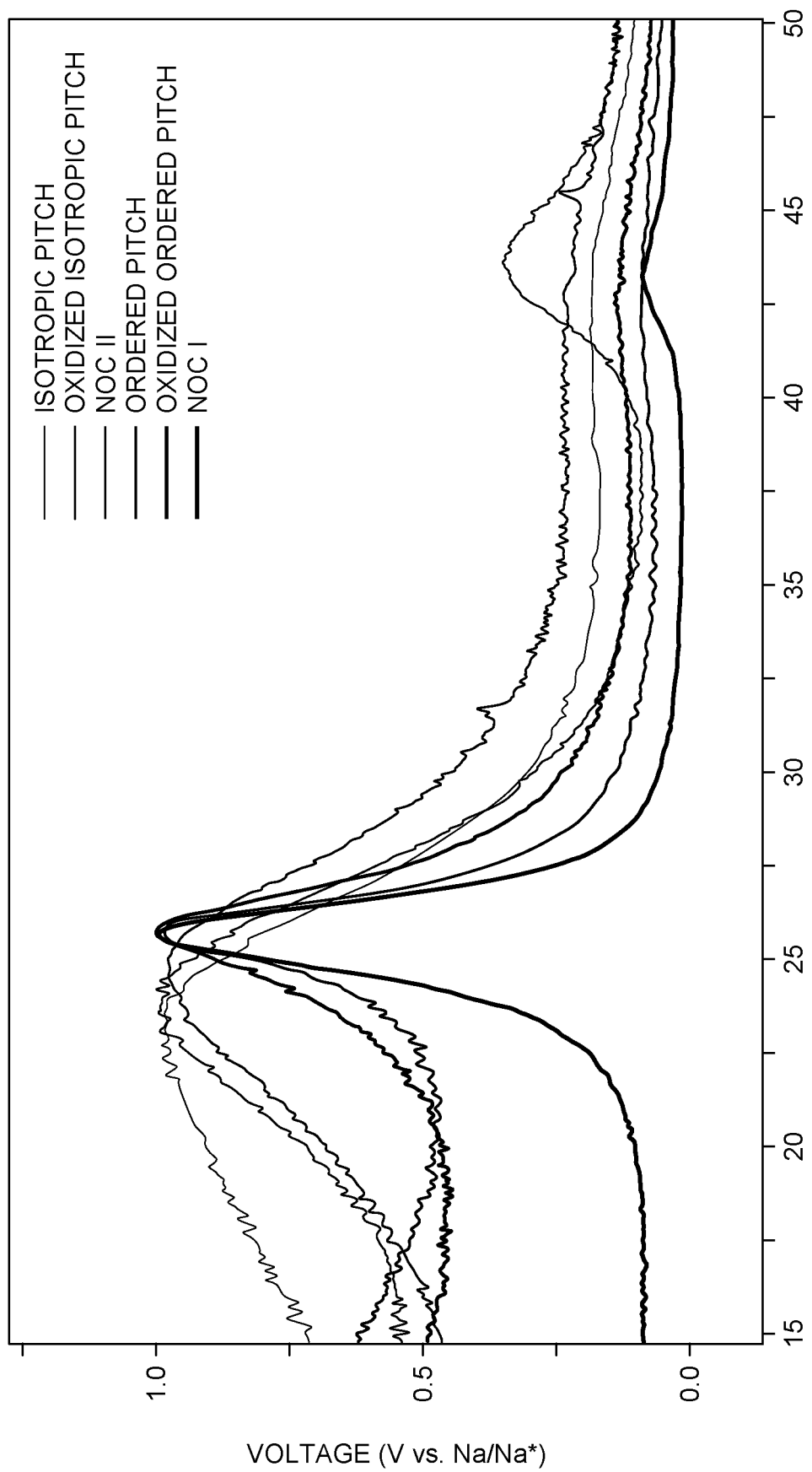
FIG. 3 is a graph showing XRD patterns of various carbon products prepared by methods described and discussed herein.

The XRD pattern, see FIG. 3, of the pre-functionalized refinery hydrocarbon intermediate from Example 2 (isotropic pitch) shows a very broad peak at 2θ<25°, in contrast to a sharp peak for the pre-functionalized intermediate from Example 1 (ordered pitch) at 2θ≈26°. This indicates that the isotropic pitch intermediate from Example 2 has less ordered structure, represented by larger average d-spacing (d002=about 3.6 Å to about 4.5 Å) and wider distribution of d-spacing. The ordered pitch intermediate from Example 1 on the contrary, has more ordered structure with higher crystallinity, represented by smaller average d-spacing (d002=about 3.4 Å to about 3.6 Å) and narrower distribution of d-spacing. After deep oxidation, the oxygen contents of intermediates from both methods increased to about 20 wt % to about 30 wt %. However, the deeply oxidized isotropic pitch intermediate from Example 2 still shows less ordered structure (broader d002 peak at lower angle) compared to oxidized ordered pitch from Example 1. It is theorized that the less ordered structure in the oxidized intermediates can help prevent growth of crystallite structure during carbonization process. As a result, after carbonization step, NOC I material from Example 1 has a highly crystallite structure with smaller average d-spacing (d002=about 3.4 Å to about 3.6 Å) and narrower distribution of d-spacing. In contrast, NOC II material from Example 2 possessed larger average d-spacing (d002=about 3.6 Å to about 3.9 Å) and wider distribution of d-spacing. It is theorized that the larger average d-spacing could facilitate interaction of sodium ions between graphene sheets.

In addition to d-spacing, NOC I and NOC II could also be distinguished by porous structure. With less ordered structure, NOC II material from Example 2 has more pores. As a result, NOC II has lower true density (1.2-1.8 g/cc) compared to that of NOC I (1.8-2.3 g/cc). It is theorized that the porous structure could allow formation of sodium-ion nano-cluster, resulting in increased capacity.

Figure 4:
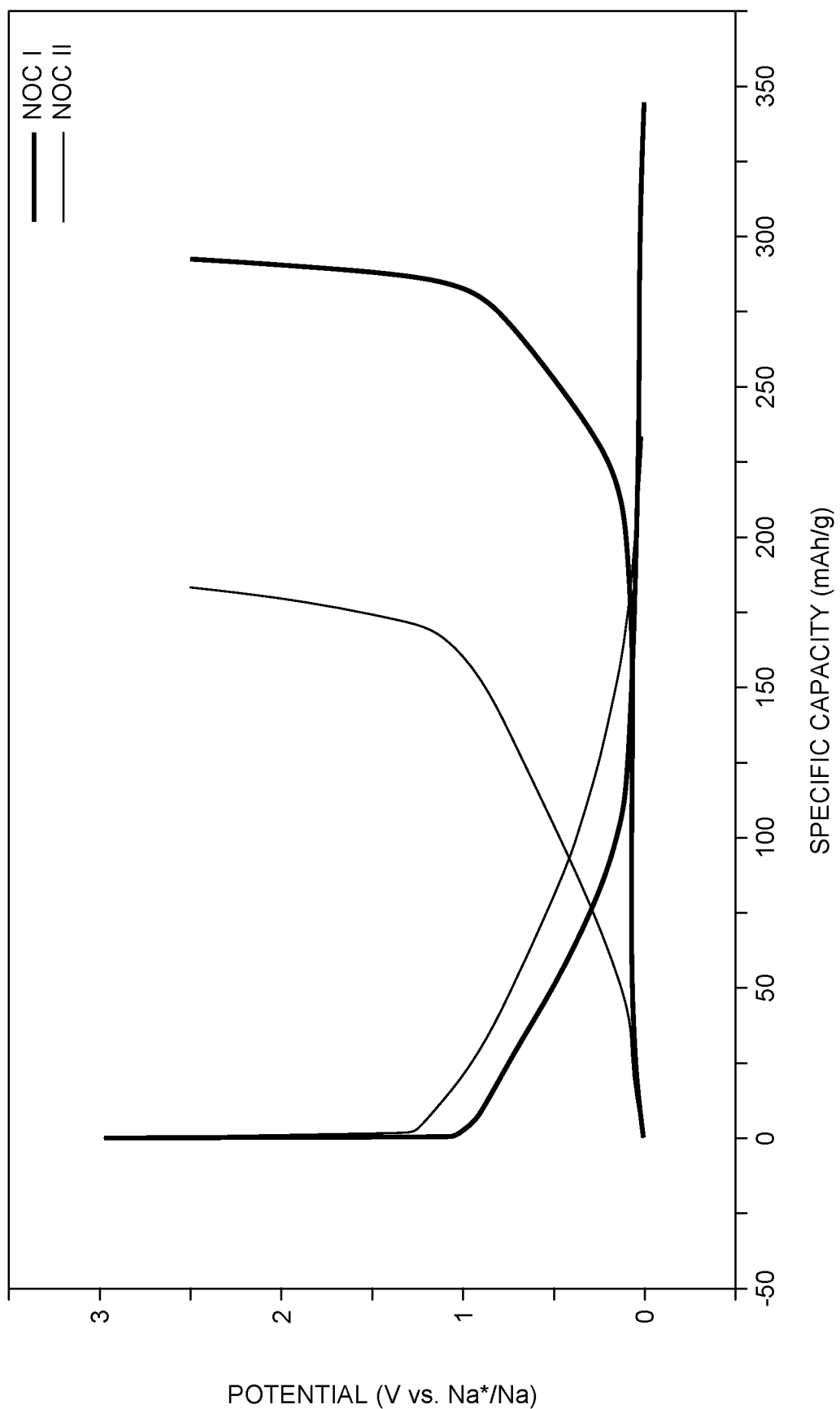
FIG. 4 is a graph showing discharge/charge profiles during the first cycle of battery half-cells containing solid nano-ordered carbon products prepared by methods described and discussed herein.

In order to verify whether the proposed mechanism works for the nano-ordered carbon materials, the nano-ordered carbon materials from Example 1 and Example 2 were tested in Na ion battery half cells. As shown in FIG. 4, NOC II from Example 2 delivered a reversible capacity of 293 mAh/g in the first cycle, significantly higher than that of NOC I material from Example 2. The largest difference between their performances is the contributions from sloping (>0.15 V) and plateau (<0.15 V) regions. The majority of the capacity from NOC II is from the plateau region (>200 mAh/g) while the NOC I material relies on the capacity in the sloping area. According to the DFT calculations in literature, the charge-discharge in the plateau area could be related to intercalation-deintercalation of Na ions between the graphene sheets and formation of nano-clusters in the pores of nano-ordered structure while the sloping capacity could be mainly due to absorption of Na ions on active sites in the material.

Table 1 summarized the performance of nano-ordered carbon materials prepared from Example 1, 2, 3, 4, and 5 with optimized functionalization conditions while keeping constant carbonization conditions. The nano-ordered carbon material generated from Example 1 is NOC I type while Example 2-5 produced NOC II type products. Among different methods, $1^{st}$ functionalization by air oxidation followed by solvent extraction and $2^{nd}$ air oxidation generated nano-ordered carbon with the highest capacity and first cycle efficiency.

TABLE 1

| | $1^{st}$ Functionalization | Purification | $2^{nd}$ Functionalization | Specific Capacity (mAh/g) | First Cycle Efficiency (%) |
|---|---|---|---|---|---|
| Example 1 | Heat soak | N/A | Air oxidation | 180 | 75 |
| Example 2 | Air oxidation | N/A | Air oxidation | 293 | 85 |
| Example 3 | Air oxidation | Solvent | Air oxidation | 328 | 86 |
| Example 4 | Acid oxidation | Solvent | Air oxidation | 310 | 80 |
| Example 5 | Sulfurization | Solvent | Air oxidation | 300 | 78 |

As shown in Table 2, the nano-ordered carbon material (NOC II) produced from Example 2 was compared to hard carbon made from the best performing commercial product made from refinery hydrocarbon products and two different hard carbon materials made from biomass.

TABLE 1

| | Feedstock | Reversible Capacity (mAh/g) | First Cycle Efficiency (%) |
|---|---|---|---|
| Commercial Hard Carbon 1 | Refinery Hydrocarbon | 200 | 80 |
| Commercial Hard Carbon II | Biomass | 300 | 84-93 |
| Commercial Hard Carbon III | Biomass | 198 | 81 |
| Example 3 | Refinery Hydrocarbon | 328 | 86 |

It is clearly shown in Table 2, that NOC II from Example 3 outperformed the hard carbon batteries made from refinery hydrocarbon products while obtaining relatively comparable properties of hard carbon batteries made from biomass feedstock. It is important to note that while Example 2 was able to achieve similar properties to Commercial Hard Carbon II its ability to use a lower cost feedstock and higher effective yield of about 50% to about 70% (compared to 10%-20% for previously known methods with biomass feedstock) makes Example 3 an improvement over currently known technology.

Further Analysis into the Example 1

Based upon the above test results, the heat soaked ordered pitch intermediates were oxidized at temperatures of about 300° C., about 325° C., about 350° C., and about 375° C. The samples were labeled OX300, OX325, OX350, and OX375, respectively. Afterwards, they were characterized with select methods to investigate how the oxidation step changed the chemical and physical characteristics. The chemical traits of the first solid functionalized product surface were first analyzed by XPS.

To analyze the samples with XPS, each sample was analyzed using a monochromatic Al Kα x-ray source at a beam diameter of 200 μm, an analyzer take-off-angle of 45°, and a chamber pressure of about 9 Torr to about 10 Torr. Charge compensation was achieved by flooding the surface with low energy electrons to eliminate charging due to photoelectron emission and low energy argon ions to dissipate static charging. Charge referencing was achieved by setting the most intense feature in the carbon region to 285.0 eV. Atomic percentages of carbon and oxygen (outer 10 nm) were determined from the average result of three survey scans collected at different locations along the sample. Survey scans were performed at a pass energy of 280 eV for 10 sweeps. Samples were run as received.

Figure 5:
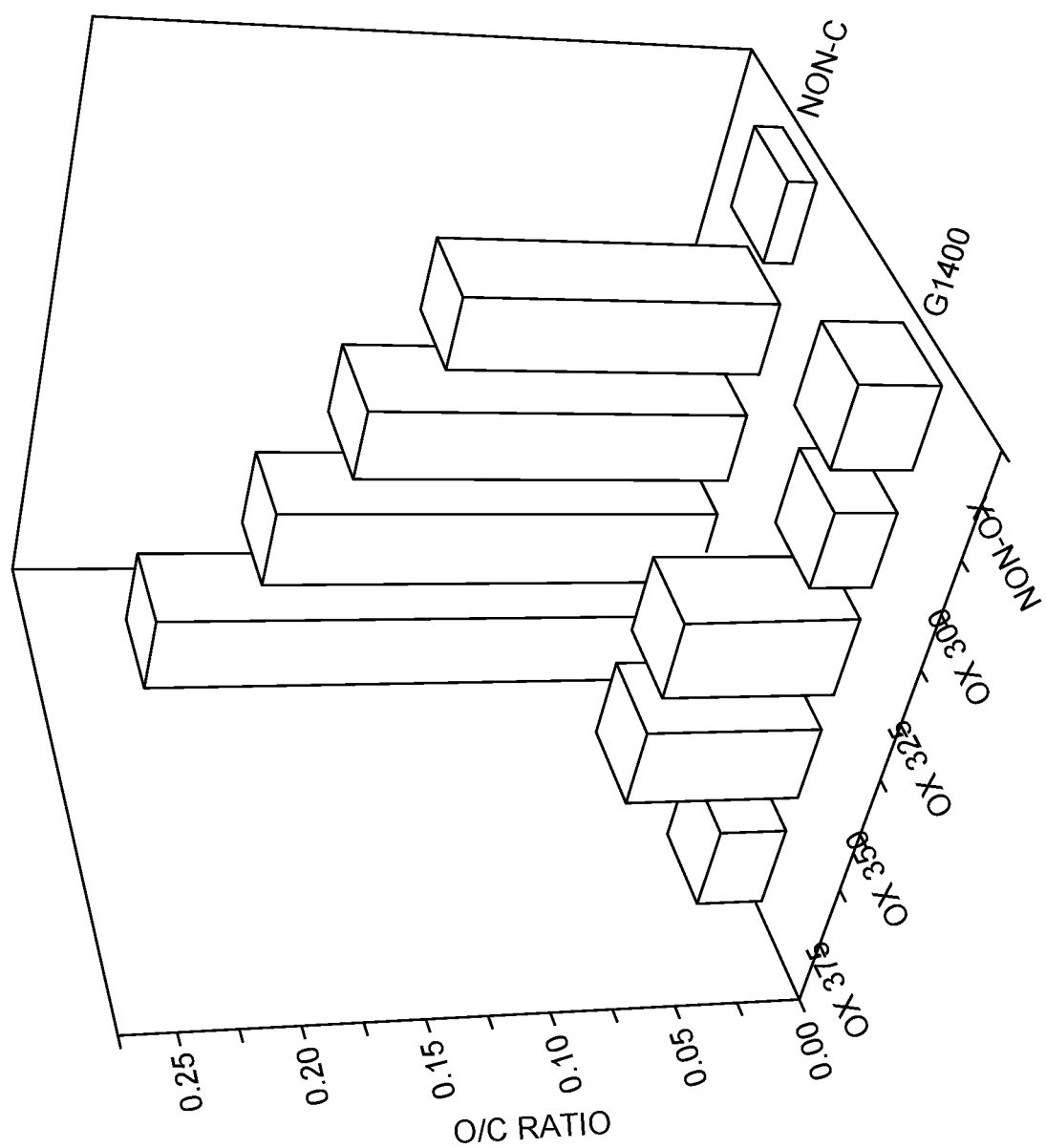
FIG. 5 is a graph showing oxygen-carbon ratios of carbon products prepared by methods described and discussed herein.

FIG. 5 shows the surface O/C molar ratios for the oxidized ordered pitches and carbonized NOC I materials. X and Y axes represent the process conditions (X for oxidation and Y for carbonization) for each material. Specifically, non-OX refers to non-oxidation, non-C is short for non-carbonization, and C1400 stands for carbonization at 1,400° C. A significant change in the O/C ratio was observed on the pitch surface after oxidation, increasing from 0.01 to over 0.10. The oxidized pitch materials also demonstrated a direct relationship between O/C ratio and oxidation temperature, rising from 0.13 at 300° C. to 0.24 at 375° C.

Figure 6:
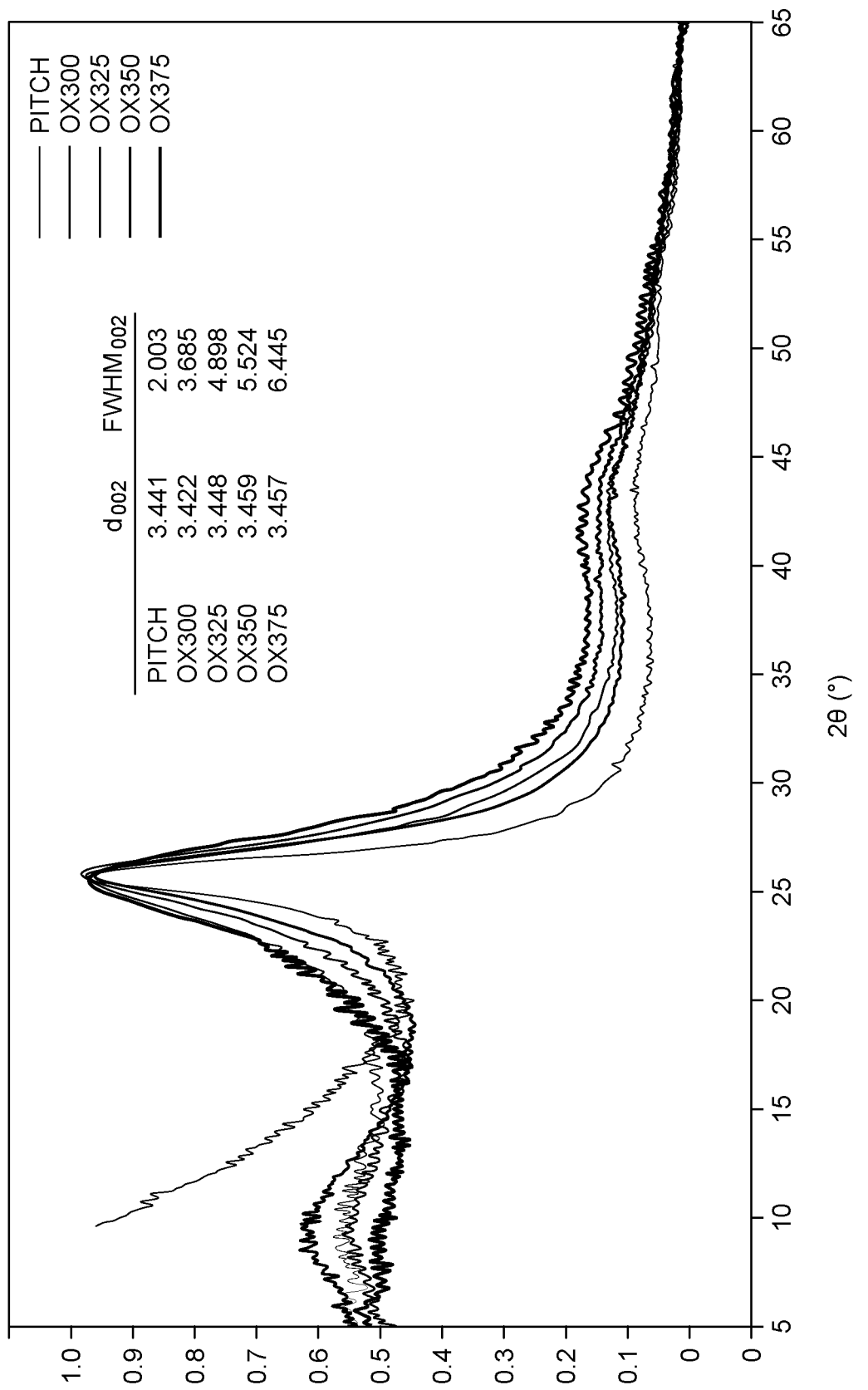
FIG. 6 is a graph showing XRD patterns of various carbon products prepared by methods described and discussed herein.

Further XRD analysis into samples OX300, OX325, OX350, and OX375 were performed as shown in FIG. 6. The most prominent feature is a peak at ~26° 2θ, corresponding to the (002) peak of graphite-like materials. The average d-spacings of the oxidized pitches slightly increased from 3.422 Å to only 3.457 Å with increasing oxidation temperature.

Figure 7A:
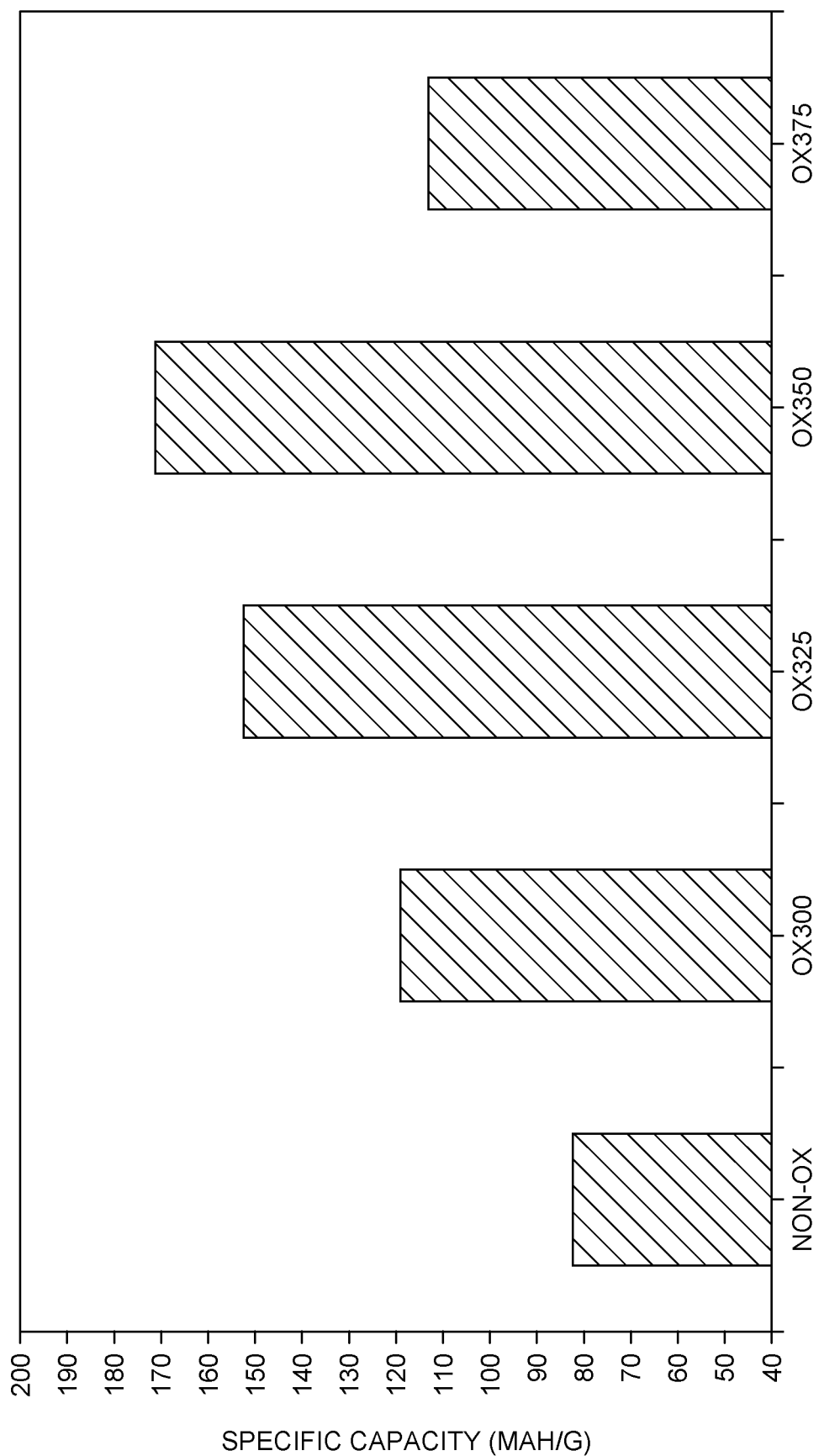
FIGS. 7A-7B are graphs showing specific capacity profiles during a first cycle of battery half-cells containing solid nano-ordered carbon products prepared by methods described and discussed herein.
Figure 7B:
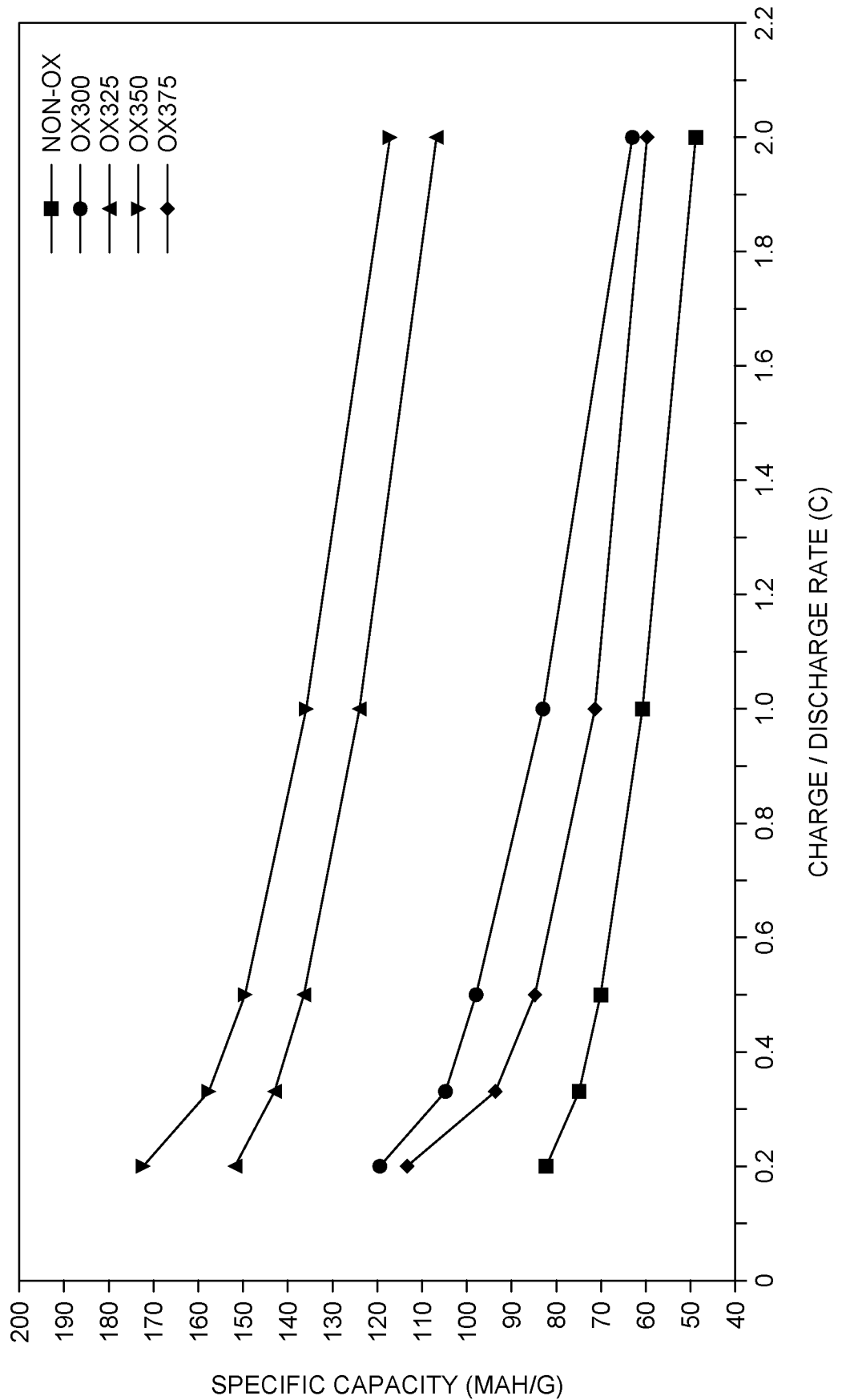

Samples OX300, OX325, OX350, and OX375 were then fabricated into electrodes that were incorporated into sodium ion half-cells to evaluate their Na ion storage capabilities. The results are shown in FIG. 7. The Non-OX-C1400 refers to a sample that did not have the step of functionalization went immediately from a refinery hydrocarbon product to carbonization at 1,400° C. The reference sample, Non-OX-C1400, showed the lowest specific capacity (about 80 mAh/g) when charged and discharged at C/5 rate. In contrast, all the oxidized NOC materials delivered higher capacities. Furthermore, the capacities of these materials increased with oxidation temperature until it reached about 174 mAh/g at 350° C. Above this temperature, the capacity of OX-375 dropped to about 115 mAh/g. The same performance trend holds for all the materials when charged and discharged at different rates (FIG. 7B).

Further Analysis into the Example 2

Figure 8:
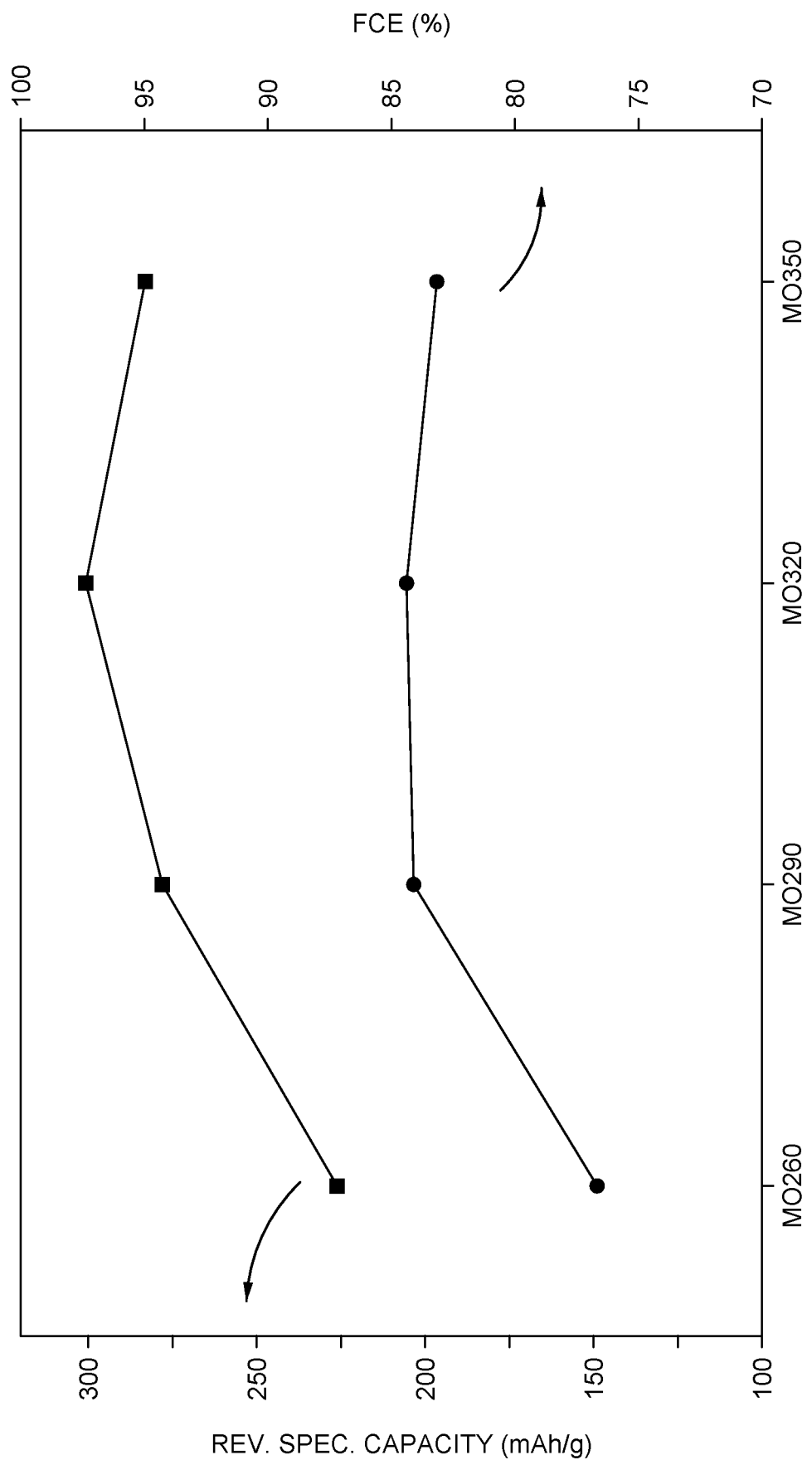
FIG. 8 is a graph showing reverse specific capacity and first cycle efficiencies (FCEs) of battery half-cells containing solid nano-ordered carbon products prepared by methods described and discussed herein.

FIG. 8 compares the performances of nano-ordered carbon materials (NOC II) that were mildly oxidized at different temperatures (260° C., 290° C., 320° C., and 350° C.) before being subjected to full functionalization at 300° C. The materials generated from these processes were labeled as MO260, MO290, MO320, and MO350 respectively. It appears that the overall performance—mainly reversible specific capacity and first cycle efficiency (FCE)—of the final product increased with mild oxidation temperature and reached a maximum (301 mAh/g specific capacity and 84.5% FCE) at 320° C. The mild oxidation may lead to insufficient functionalization and crosslinking during the deep oxidation step, which is indicated by the oxygen contents in the intermediates from the two steps, as shown in Table 3.

TABLE 3

| | Oxygen Content (wt %) | | |
|---|---|---|---|
| Sample | Feedstock | After Mild Oxidation | After Deep Oxidation |
| MO260 | 2.16 | 2.74 | 15.21 |
| MO290 | 2.16 | 3.2 | 25.9 |
| MO320 | 2.16 | 4.8 | 28.31 |
| MO350 | 2.16 | N/A | 27.2 |

The degree of functionalization and crosslinking may play a critical role in developing nano-ordered structure—interspace between flexible graphene sheets and nanopores encased by curved or entangled graphene stacks/sheets—that is proper for sodium ion storage.

Slurry Oil Fractionation

The fractionation work was carried out in three distillation units: Units I, II, and III. Unit I is configured and operated like an ASTM D2892 distillation device. Unit I can operate with different size kettles up to 5-gallon size and has a 2" diameter column filled with ProPak™ packing that provides 14-18 theoretical stages. The kettle and jacket heaters provide heat to boil the kettle product up through the column where the product is condensed, and a reflux splitter allows some of the condensed overhead liquid to return to the column. Units II and III are two similar apparatuses, with different internal diameters of distillation heads, such that Unit II has a distillation head having a diameter of 50 mm and Unit III has a distillation head having a diameter of 70 mm. Units II and III are B/R Instrument vacuum distillation systems. Units II and III are operated under vacuum and are configured the same way as mentioned in the ASTM D5236 method. Each of Units II and III includes heated flask, a heat jacket, and two entrainment separators. The separators force rising vapor through a choke point where entrained liquid drops form larger droplets. The droplets become larger and larger and due to the gravity force and then the droplets fall back to the boiling flask. In the end, only distilled vapors are collected after being condensed in the overhead product. The Maxwell-Bonnell correlation with K-factor correction was used during the runs under vacuum to ensure cut points are taken at the correct Atmospheric Equivalent Temperature (AET).

Two fractions were collected in the Unit I from the Refinery I slurry: IBP-710° F. and 710+° F. under 9 mmHg vacuum. The 710+° F. became the feed for the Unit III and three more fractions were collected at: 710° F.-775° F., 776° F.-930° F., and 931+° F. under 1 mmHg vacuum.

Three fractions were collected in the Unit I from the Refinery II slurry: IBP-500° F., 501° F.-700° F., and 700+° F. under vacuum ranging from 3.9 mmHg to 30.2 mmHg. Then 700+° F. material was charged in the Unit II and three more fractions were collected: 700° F.-800° F., 801° F.-930° F., and 931+° F. under 1 mmHg vacuum.

Characterization of Slurry Oil Fractions by NMR

NMR spectra were obtained on a Bruker Avance III HD 400 NMR spectrometer, operating at 400.16 MHz for proton (1H), and 100.04 MHz for carbon (13C). Chloroform-d (with Iron (III) trifluoroacetylacetonate as a relaxation agent) was used as a solvent. Samples were run at 50° C. Tetramethylsilane (TMS) was used as an internal chemical shift reference (0 ppm) for both 1H and 13C. All the chemical shifts are reported in ppm relative to TMS. Sixty-four and 2048 scans were acquired for 1H and 13C, respectively. For distortionless enhancement by polarization transfer (DEPT) and quaternary-only (QUAT) carbon spectra, the carbon-hydrogen spin coupling constant was set to 145 Hz.

Characterization of Slurry Oil Fractions by GC×GC-MS

The GC×GC analysis system consisted of a ZOEX ZX2 thermal modulator integrated with an Agilent 7890B gas chromatograph. The primary column was a Trajan Scientific capillary GC column, BPX5 (length 15 m, ID 0.25 mm and film thickness of 0.25 μm; Trajan Scientific Americas Inc., Pflugerville, Tex., USA) and the secondary column was a BPX50 (length 1 m, ID 0.1 mm and film thickness 0.1 μm). The modulator period was set at 12 s with a duration of 350 ms. The hot jet temperature was as follows: 250° C. for 2 minutes then ramped to 400° C. at a rate of 4° C./min and held at that temperature for 141 minutes. The cold jet gas flow rate was set at 18 L/min. The GC helium carrier gas flow rate was set to 0.9 mL/min. Samples were diluted with methylene chloride (50:50% v/v) and analysis was performed by injecting 1 μL of sample at a split ratio of 20/1. The GC oven temperature was as follows: 50° C. for 1 minute then ramped to a final temperature of 370° C. at a rate of 3° C./min and held at that temperature for 23 minutes for a total run time of 130 minutes. The GC interface temperature was set at 280° C. Analytes emanating from the GC columns were ionized by field ionization (FI) for quantitation of sample components. The Fl emitter was set at ground potential. The ion source temperature was set at 50° C. The detector voltage was set at 2,600 V and the extraction rods (counter electrode) set at −10 kV. Mass analysis was performed with a time-of-flight mass spectrometer (AccuTOF-GCx, Jeol Inc., Peabody Mass., USA). The data was acquired by use of the MsAxel software with a recording interval of 10 Hz and sampling rate of 4 GHz. Data was acquired in the mass range 50-800 Da.

Preparation of NOC Materials

In these experiments, 5 g slurry oil fraction was first placed in a large rectangle crucible and oxidized in a muffle furnace with a programmed temperature profile (ramp to 320° C. at 3° C./min and hold for 24 h). During the temperature ramp, the solid sample melted and formed a thin liquid layer at the bottom of the crucible. As the oxidation time increased, the liquid layer became solidified and transitioned to isotropic pitch. After the mild oxidation, the isotropic pitch was ground into powder with mortar and pestle. The powdered pitch was set in the muffle furnace again for deep oxidation at 300° C. for 3 h. The highly oxidized pitch was carbonized in a laboratory tube furnace under nitrogen atmosphere with a stepped temperature program (ramp to a desired temperature at 5° C./min and hold for 2 h) to prepare the NOC materials.

Preparation of Electrode

The electrodes were prepared by casting a well-mixed dispersion of hard carbon: alginate binder: carbon black (90:5:5 in weight) in water onto a carbon-coated aluminum substrate with a doctor blade to form a thin film. The electrode film was then dried in a vacuum oven at 80° C. for 1 h.

Preparation of Coin Cells

Disks with 1.5 cm diameter were punched out from the electrode films using a die cutter (MTI™ MSK-T-07). The mass loading of active materials on these disks varied from 5 to 6 mg/disc. Each sodium ion coin cell was prepared in an argon-filled glovebox by sequentially stacking a Na metal as anode, a separator (a layer of Whatman® glass fiber filter), an electrode disk as cathode, a stainless steel disk spacer, and a wave spring in a bottom can. An electrolyte of 1 M $NaPF_6$ in 50 vol % ethylene carbonate and 50 vol % dimethyl carbonate (purchased from Sigma-Aldrich®) was added to the separator before the electrode disk was stacked. After the top can was placed over the bottom can, the assembly was crimped and sealed by a coin cell crimper (MTI™ MSK-110). In the case of preparing lithium-ion coin cells, a Li metal disk was used as anode and a solution of 1 M $LiPF_6$ in 40 vol % ethylene carbonate, 30 vol % dimethyl carbonate, and 30 vol % diethyl carbonate (purchased from Sigma-Aldrich®) was injected as electrolyte.

Electrochemical Test

The electrochemical tests were performed on a battery tester (Neware® BTS4000 for sodium ion cells and Arbin® potentiostat/galvanostat for lithium-ion cells). The electrical charge passed during each charge/discharge cycle was recorded and used to calculate the specific capacity and coulombic efficiency. All the tests were conducted at ambient temperature.

Additional Details

Several heavy streams from refining operations could be used for the nano-ordered carbon (NOC) production. These streams usually contain about 20 wt % to about 99 wt % of aromatic molecules (including mono-aromatics and polyaromatics, detailed GC×GC data available upon request). NMR characterization shows that 20%-80% of carbon in these streams belong to aromatic carbon family (detailed NMR data available upon request). The average molecular weight of these streams ranges from 100 to 400. These streams include, but are not limited to, vacuum gas oil from vacuum distillation, slurry oil from FCC operation, and/or coker gas oil from coking process.

A capability of controlling product performance with practical means is highly desired for a manufacturing process. The current invention takes advantage of the distribution of polyaromatics in these refinery heavy streams and uses a unique and practical way to control product performance by separating the original feeds into fractions with well-defined distributions of the building blocks. The applicable separation methods include fractionation, and/or solvent extraction. For example, slurry oils from Refinery I and Refinery II were fractionated into a heavy cut and median cut.

Figure 9A:
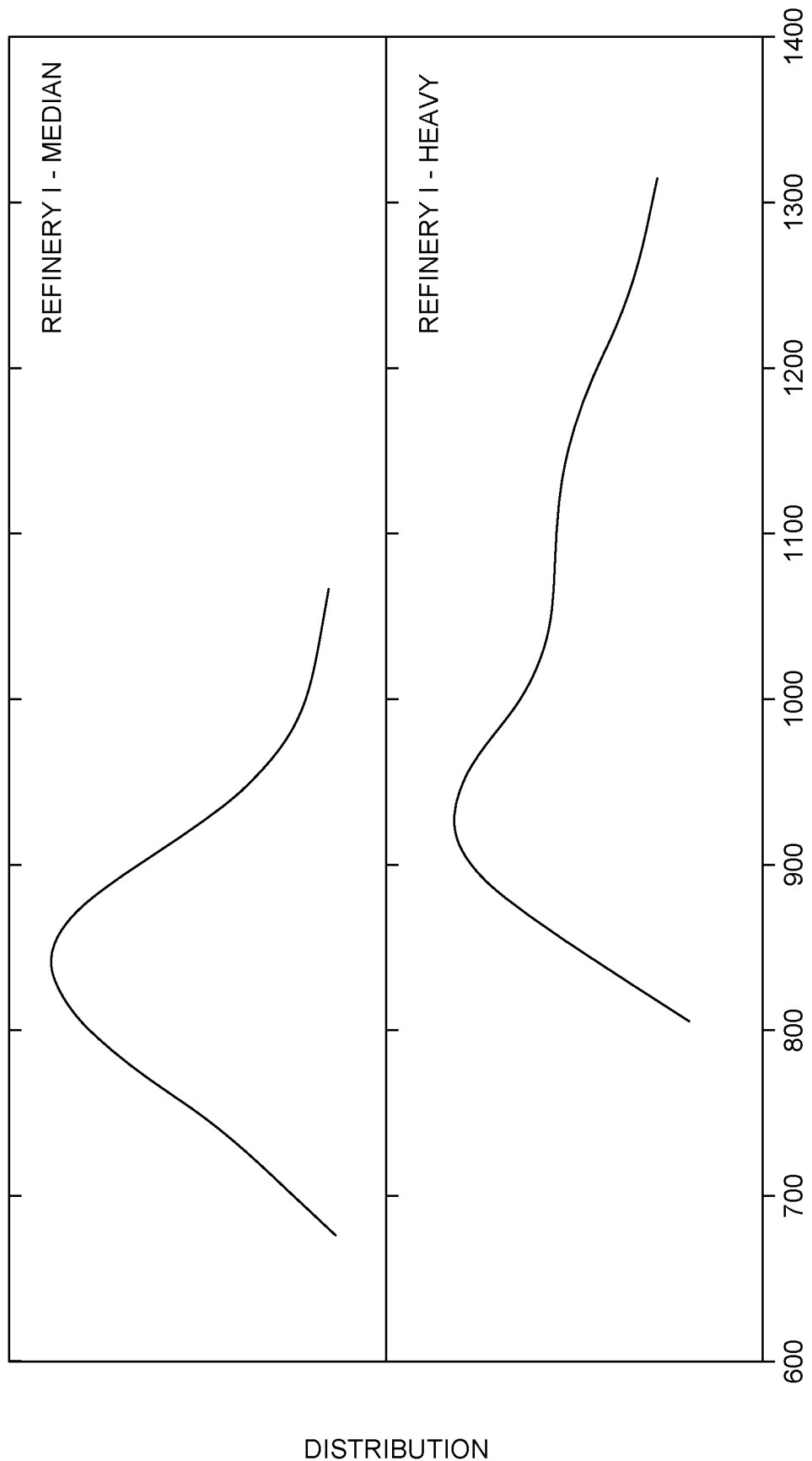
FIGS. 9A-9B are graphs showing the distributions of the slurry oil components with different boiling points in heavy and median cuts as described and discussed herein.
Figure 9B:
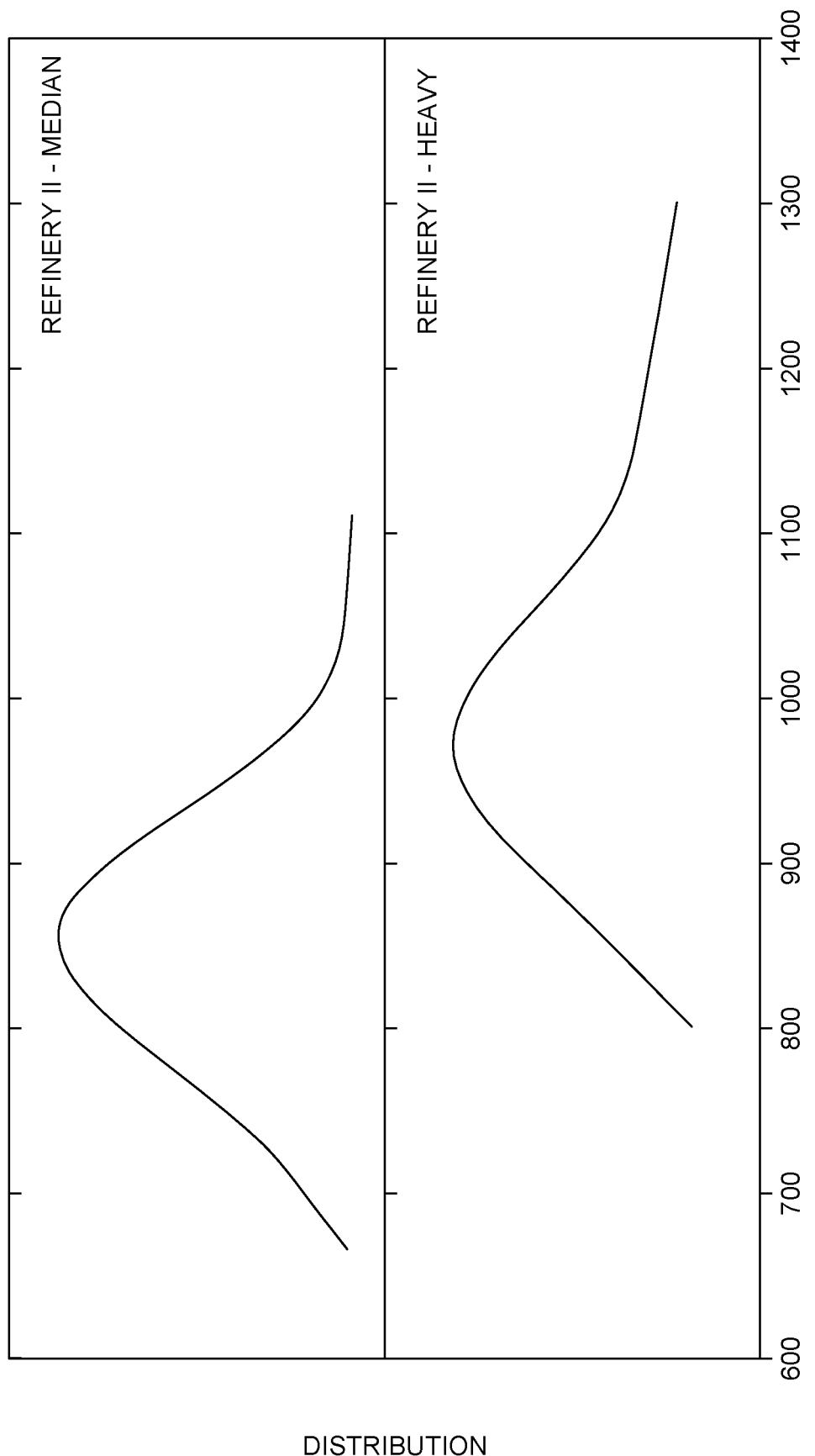

FIGS. 9A-9B are graphs showing the distributions of the slurry oil components with different boiling points in heavy and median cuts. The heavy cuts from both Refineries I and II have higher boiling point ranges (about 800° F. to about 1,200° F.) than the median cuts (about 600° F. to about 1,000° F.). from these refineries respectively. The distribution of the heavy cut boiling point is centered about 900° F. to about 1,000° F. while the median cut boiling point is centered about 800° F. to about 850° F.

Figure 10A:
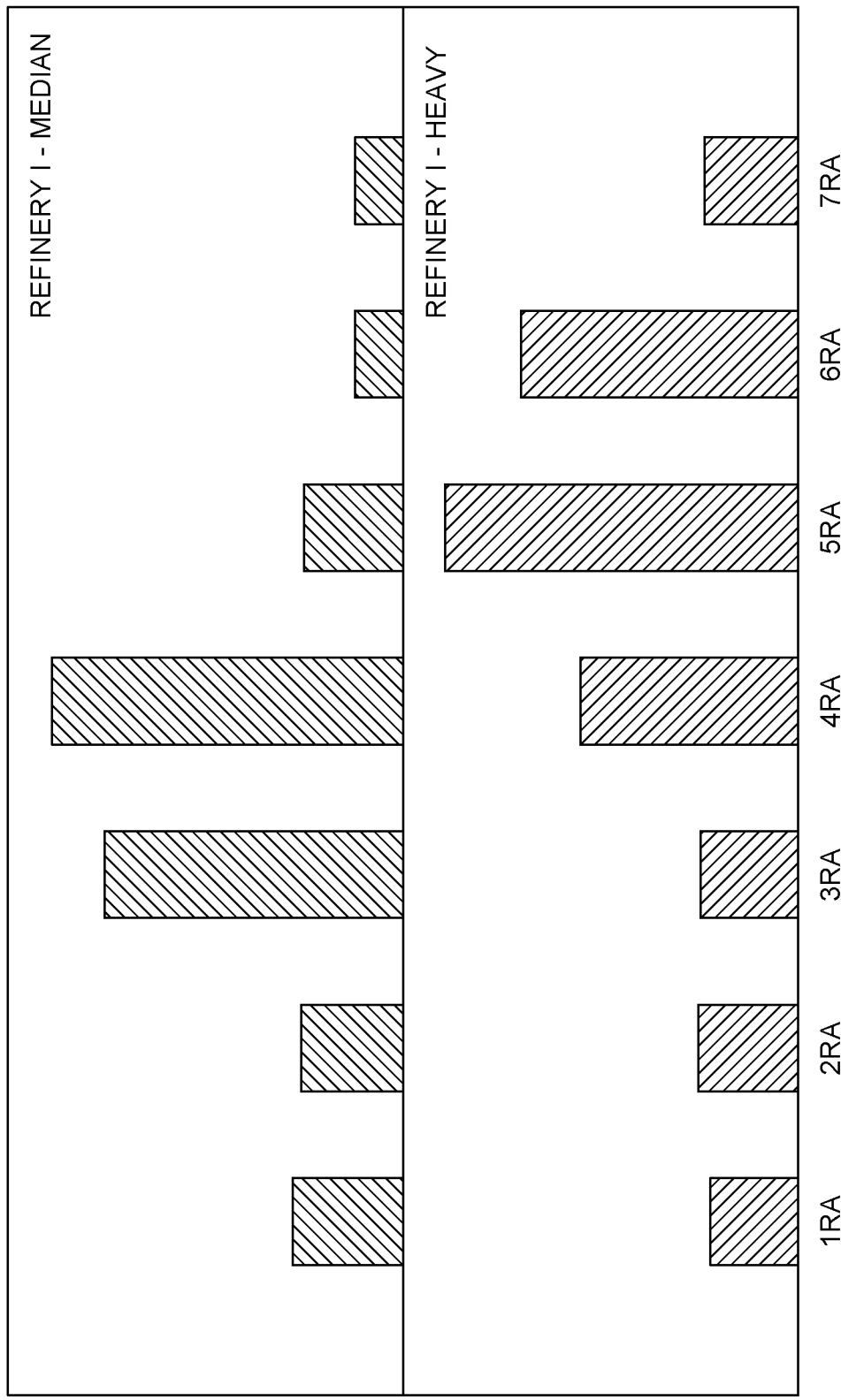
FIGS. 10A-10B are graphs showing the distributions of polyaromatic compounds contained within in heavy and median cuts as described and discussed. herein.
Figure 10B:
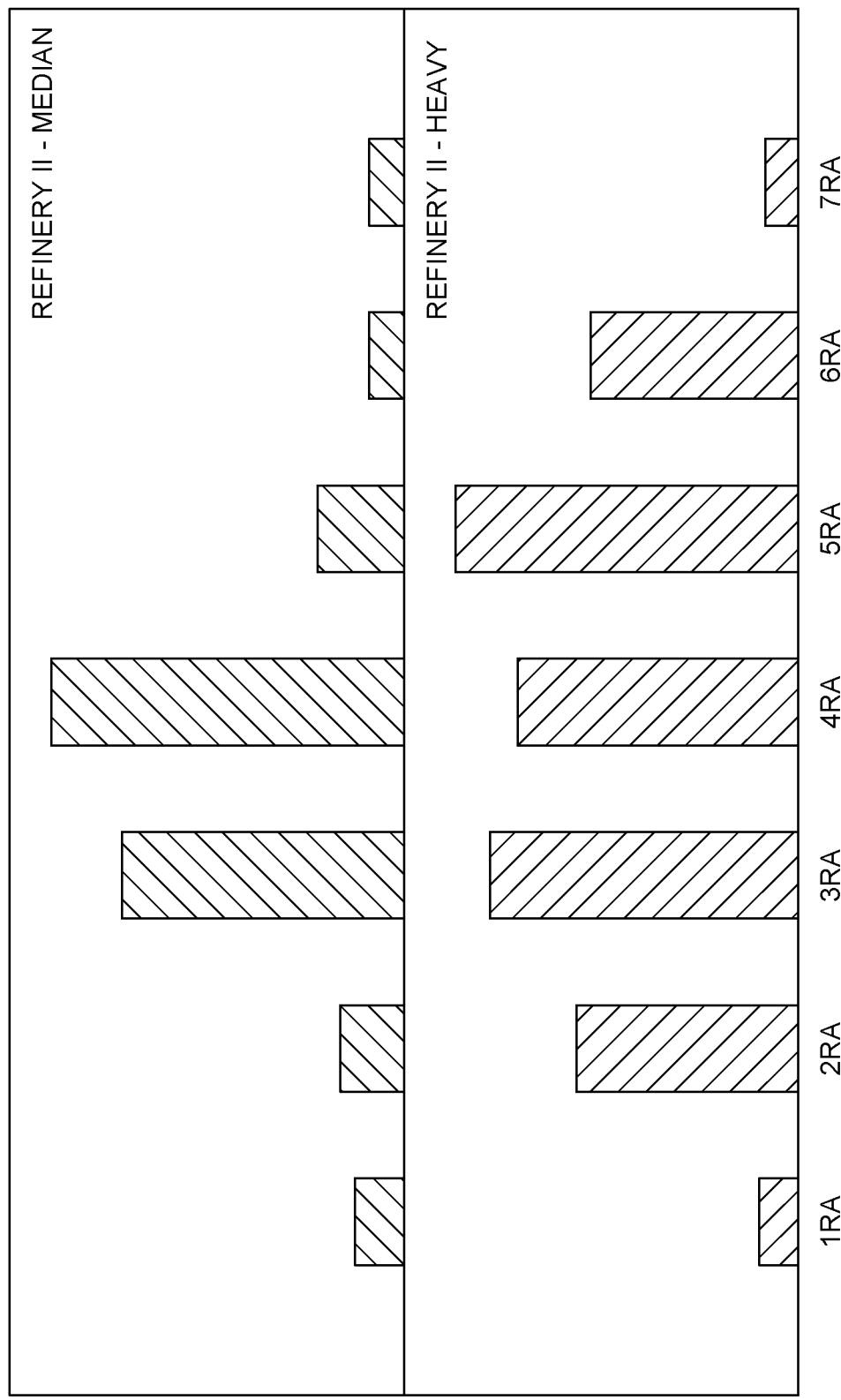

FIGS. 10A-10B are graphs showing the distributions of polyaromatic compounds contained within in heavy and median cuts. GC×GC analysis revealed that the distributions of polyaromatics in these cuts are different. The heavy cuts of slurry oils from both Refineries I and II contain polyaromatics with higher average number of aromatic rings compared to median cuts. Table 3 shows two-dimensional gas chromatography/mass spectroscopy (2D GC-MS) data collected for the median cuts and the heavy cuts from both Refineries I and II.

TABLE 3

| Components | I-Median | I-Heavy | II-Median | II-Heavy |
|---|---|---|---|---|
| Paraffin | 0.13 | 0 | 3.55 | 0.02 |
| Naphthene | 2.91 | 0 | 17.45 | 4.36 |

TABLE 3-continued

| Components | I-Median | I-Heavy | II-Median | II-Heavy |
|---|---|---|---|---|
| 1RA | 2.09 | 0.56 | 7.26 | 4.26 |
| 2RA | 4.54 | 15.86 | 6.05 | 5.52 |
| 3RA | 36.24 | 22.77 | 27.19 | 5.35 |
| 4RA | 46.67 | 20.6 | 32.65 | 18.1 |
| 5RA | 7.39 | 25.78 | 5.77 | 32.84 |
| 6RA | 0.04 | 14.43 | 0.08 | 24.66 |
| 7RA | 0 | 0 | 0 | 4.89 |
| Average Ring Number in Aromatics | 3.55 | 3.98 | 3.30 | 4.71 |

Figure 11:
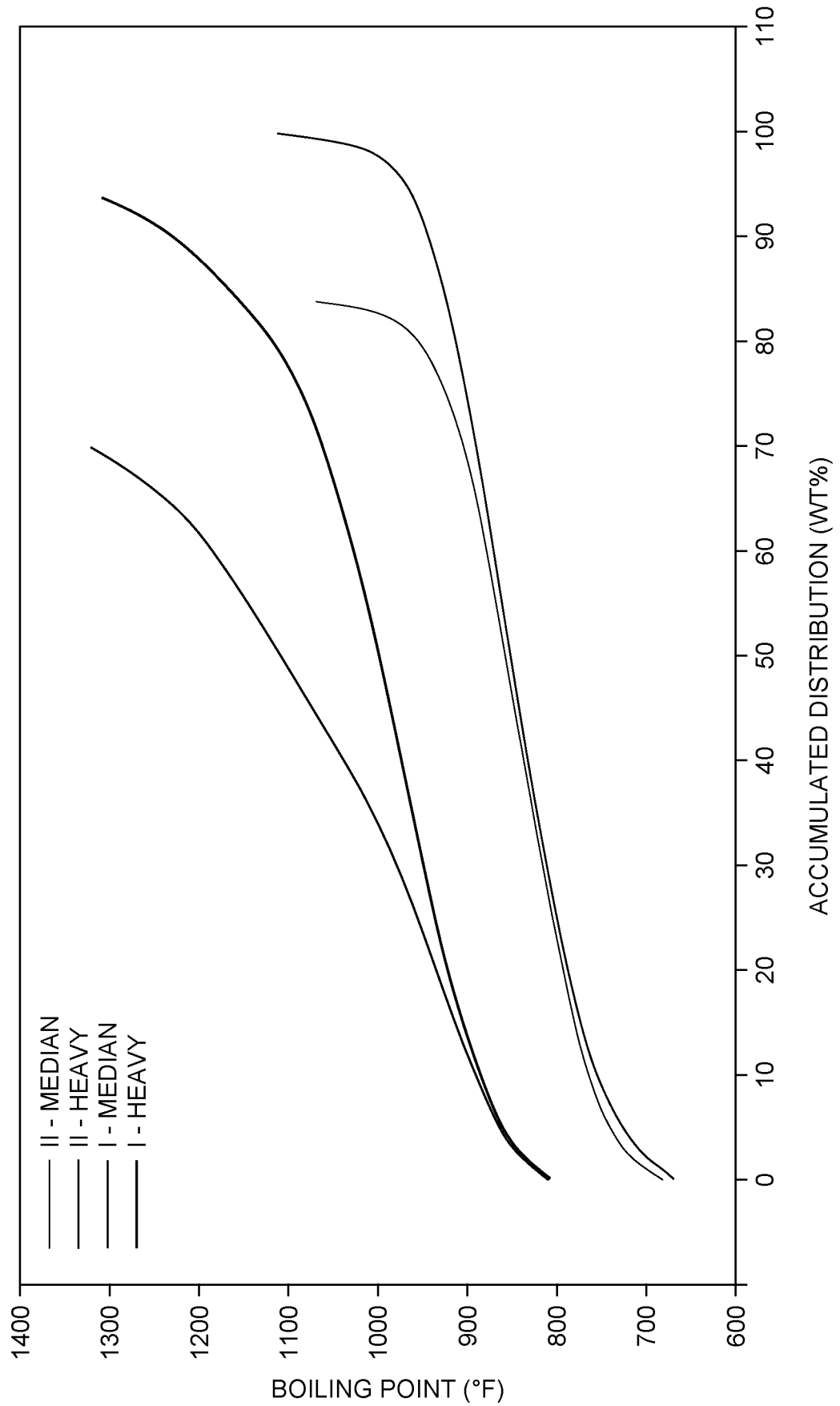
FIG. 11 is a graph showing boiling point temperature verses accumulated distribution of heavy and median cuts as described and discussed herein.

FIG. 11 is a graph showing boiling point temperature verses accumulated distribution of heavy and median cuts. The heavy cuts from both Refineries I and II have higher boiling point ranges (about 800° F. to about 1,200° F.) than the median cuts (about 600° F. to about 1,000° F.) from these refineries respectively. The distribution of the heavy cut boiling point is centered about 900° F. to about 1,000° F. while the median cut boiling point is centered about 800° F. to about 850° F.

Figure 12:
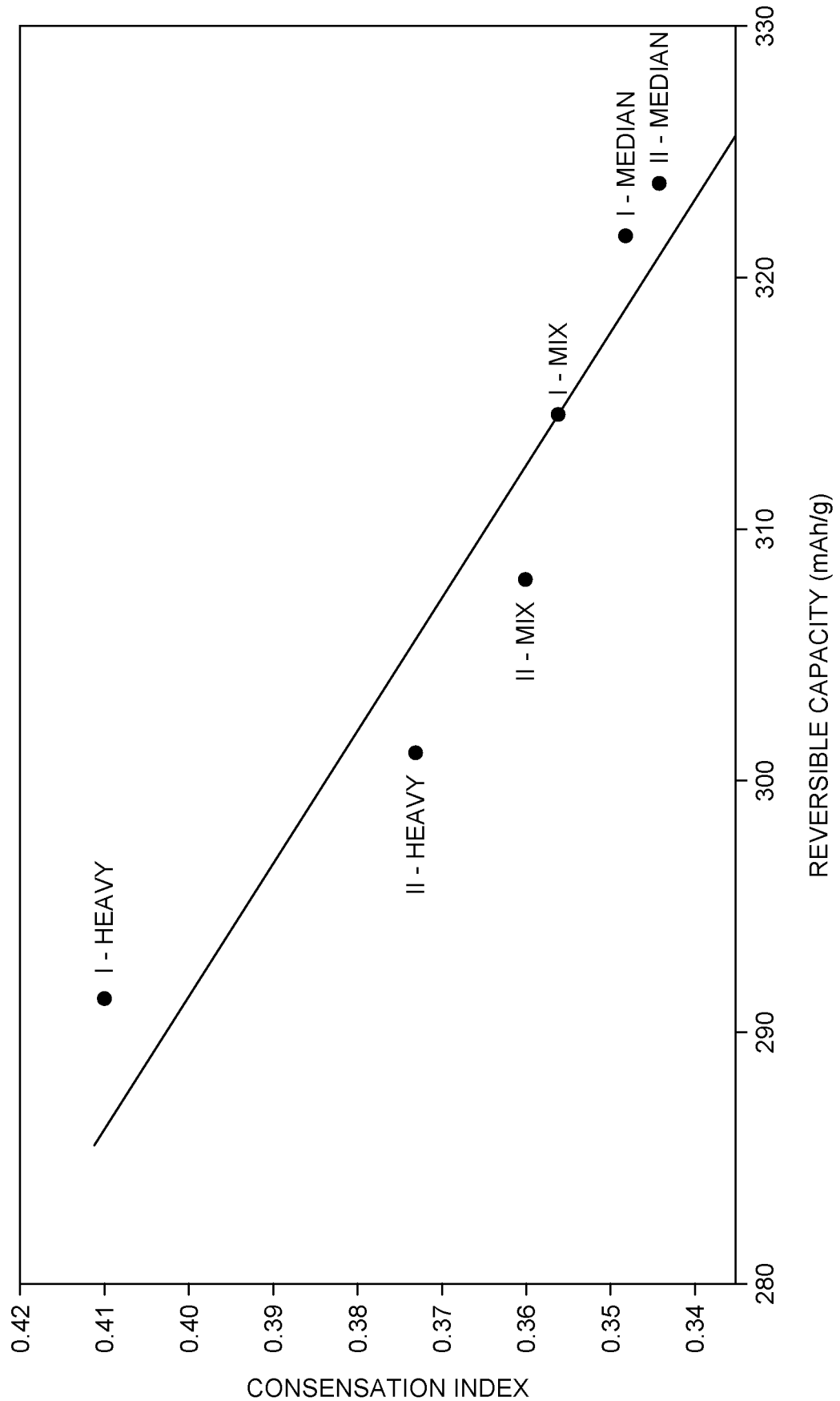
FIG. 12 is a graph showing condensation index verses reversible capacity of battery half-cells containing solid nano-ordered carbon products prepared by methods described and discussed herein.

NMR analysis found that the condensation index, indicating the size and shape of polyaromatics, changed accordingly from median cuts to heavy cuts. As a result of the changing distribution of polyaromatics in the heavy and median cuts, the performance of the carbon products generated from these feeds varied. FIG. 12 is a graph showing condensation index verses reversible capacity of battery half-cells containing solid nano-ordered carbon products. The correlation between the condensation index of the slurry oil cuts and reversible specific capacities of hard carbon products prepared from these cuts. The discovery leads to the invention that proper feeds with defined polyaromatic distributions can be separated from original refinery heavy streams for manufacturing carbon products with different performances. The fractions could also be mixed to produce a product with balanced performance as shown in FIG. 12. The mixing of fraction brings several benefits to the process: 1) maximize utilization of usable molecules in the initial feedstock while keep sufficient performance; 2) obtain desired performance by mixing fractions with different ratios; and/or 3) expand feedstock availability be mixing feedstocks from different sources.

While the foregoing is directed to embodiments of the disclosure, other and further embodiments may be devised without departing from the basic scope thereof, and the scope thereof is determined by the claims that follow. All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby. Likewise, the term "comprising" is considered synonymous with the term "including" for purposes of United States law. Likewise, whenever a composition, an element, or a group of elements is preceded with the transitional phrase "comprising", it is understood that the same composition or group of elements with transitional phrases "consisting essentially of", "consisting of", "selected from the group of consisting of", or "is" preceding the recitation of the composition, element, or elements and vice versa, are contemplated. As used herein, the term "about" refers to a +/−10% variation from the nominal value. It is to be understood that such a variation can be included in any value provided herein.

Certain embodiments and features have been described using a set of numerical minimum values and a set of numerical maximum values. It should be appreciated that ranges including the combination of any two values, e.g., the combination of any minimum value with any maximum value, the combination of any two minimum values, and/or the combination of any two maximum values are contemplated unless otherwise indicated. Certain minimum values, maximum values, and ranges appear in one or more claims below.

What is claimed is:

1. A method for preparing a nano-ordered carbon, comprising:
   fractioning an initial refinery hydrocarbon product during a fractionation process to produce a liquid refinery hydrocarbon product having a condensation index of 0.36 or less and a heavy refinery hydrocarbon product having a condensation index of greater than 0.36;
   exposing the liquid refinery hydrocarbon product, the heavy refinery hydrocarbon product, or a mixture thereof to a first functionalization agent to produce a first solid functionalized product during a first functionalization process;
   purifying the first solid functionalized product during a purification process;
   exposing the first solid functionalized product to a second functionalization agent to produce a second solid functionalized product during a second functionalization process; and
   carbonizing the second solid functionalized product to produce a solid nano-ordered carbon product during a carbonization process.

2. The method of claim 1, wherein the condensation index of the liquid refinery hydrocarbon product is about 0.32 to about 0.36.

3. The method of claim 1, wherein the condensation index of the heavy refinery hydrocarbon product is greater than 0.36 to about 0.42.

4. The method of claim 1, wherein the liquid refinery hydrocarbon product has an average boiling point of about 315° C. to about 540° C.

5. The method of claim 1, wherein the heavy refinery hydrocarbon product has an average boiling point of about 425° C. to about 650° C.

6. The method of claim 1, wherein the liquid refinery hydrocarbon product has an average number of aromatic rings of about 2 to about 5 or about 3.20 to about 3.74.

7. The method of claim 1, wherein the heavy refinery hydrocarbon product has an average number of aromatic rings of about 3 to about 7 or about 3.75 to about 4.20.

8. The method of claim 1, wherein a mixture of the liquid refinery hydrocarbon product and the heavy refinery hydrocarbon product is combined with the first functionalization agent to produce the first solid functionalized product during the first functionalization process.

9. The method of claim 8, wherein the mixture of the liquid refinery hydrocarbon product and the heavy refinery hydrocarbon product has a weight ratio of about 90:10 to about 10:90 of the liquid refinery hydrocarbon product relative to the heavy refinery hydrocarbon product.

10. The method of claim 1, wherein the liquid refinery hydrocarbon product comprises a fluid catalytic cracking (FCC) slurry oil, a heavy hydrocarbon stream comprising polyaromatic hydrocarbons, a coker gas oil, a vacuum or distillation gas oil, an ethylene tar, a coal tar, a cracking fluid, or any combination thereof.

11. The method of claim 1, wherein the first functionalization agent comprises at least one element selected from oxygen, sulfur, phosphorous, nitrogen, or any combination thereof.

12. The method of claim 1, wherein each of the first functionalization process and the second functionalization process independently comprises an air oxidation process, an acid treatment process, a sulfurization process, a peroxide oxidation process, an organic compound oxidation process, a crosslinking process, or any combination thereof.

13. The method of claim 1, wherein each of the first functionalization agent and the second functionalization agent is independently selected from oxygen gas ($O_2$), air, oxygen-enriched air, sulfuric acid, nitric acid, phosphoric acid, hydrogen peroxide, elemental sulfur ($S_8$), elemental phosphorus ($P_4$), or any combination thereof.

14. The method of claim 1, wherein the first solid functionalized product comprises about 1 wt % to less than 15 wt % of a functional group selected from oxygen, sulfur, phosphorous, or nitrogen.

15. The method of claim 1, wherein the first solid functionalized product is ground into particles having an average particle size of less than 250 μm prior to the purification process or the second functionalization process.

16. The method of claim 1, wherein the first solid functionalized product is exposed to a solvent extraction during the purification process.

17. The method of claim 1, wherein the second solid functionalized product comprises 15 wt % to about 50 wt % of a functional group selected from oxygen, sulfur, phosphorous, nitrogen, or any combination thereof.

18. The method of claim 1, wherein the second solid functionalized product is heated to a temperature of about 1,000° C. to about 2,900° C. during the carbonization process.

19. The method of claim 1, wherein the solid nano-ordered carbon product has interspacing of about 3.4 Å to about 3.9 Å.

20. A method for preparing a nano-ordered carbon, comprising:
fractioning an initial refinery hydrocarbon product at a temperature of about 315° C. to about 540° C. during a fractionation process to produce a liquid refinery hydrocarbon product having a condensation index of 0.36 or less;
exposing the liquid refinery hydrocarbon product to a first functionalization agent to produce a first solid functionalized product during a first functionalization process;
exposing the first solid functionalized product to a second functionalization agent to produce a second solid functionalized product during a second functionalization process; and
carbonizing the second solid functionalized product to produce a solid nano-ordered carbon product during a carbonization process.

21. The method of claim 20, wherein the condensation index of the liquid refinery hydrocarbon product is about 0.32 to about 0.36.

22. The method of claim 20, wherein the liquid refinery hydrocarbon product has an average boiling point of about 315° C. to 540° C.

23. The method of claim 20, wherein the liquid refinery hydrocarbon product has an average number of aromatic rings of about 2 to about 5 or about 3.20 to about 3.74.

24. A method for preparing a nano-ordered carbon, comprising:
fractioning an initial refinery hydrocarbon product during a fractionation process to produce a liquid refinery hydrocarbon product having a condensation index of 0.36 or less and an average number of aromatic rings of about 2 to about 5 or about 3.20 to about 3.74 and a heavy refinery hydrocarbon product having a condensation index of greater than 0.36;
exposing the liquid refinery hydrocarbon product, the heavy refinery hydrocarbon product, or a mixture thereof to a first oxidizing agent to produce a first solid functionalized product during a first oxidation process, wherein the first solid functionalized product comprises about 1 wt % to less than 15 wt % of oxygen;
purifying the first solid functionalized product during a purification process;
exposing the first solid functionalized product to a second oxidizing agent to produce a second solid functionalized product during a second oxidation process, wherein the second solid functionalized product comprises 15 wt % to about 50 wt % of oxygen; and
carbonizing the second solid functionalized product to produce a solid nano-ordered carbon product during a carbonization process.

* * * * *